(12) United States Patent
Shimomura et al.

(10) Patent No.: US 10,049,325 B2
(45) Date of Patent: Aug. 14, 2018

(54) INFORMATION PROCESSING TO PROVIDE ENTERTAINING AGENT FOR A GAME CHARACTER

(75) Inventors: Hideki Shimomura, Kanagawa (JP); Kenta Kawamoto, Tokyo (JP); Kohtaro Sabe, Tokyo (JP)

(73) Assignee: Sony Corporation, Tokyo (JP)

( * ) Notice: Subject to any disclaimer, the term of this patent is extended or adjusted under 35 U.S.C. 154(b) by 345 days.

(21) Appl. No.: 13/561,704

(22) Filed: Jul. 30, 2012

(65) Prior Publication Data
US 2013/0066816 A1 Mar. 14, 2013

(30) Foreign Application Priority Data

Sep. 8, 2011 (JP) .................................. 2011-195619

(51) Int. Cl.
*G06F 15/18* (2006.01)
*G06N 7/00* (2006.01)

(52) U.S. Cl.
CPC .................................... *G06N 7/005* (2013.01)

(58) Field of Classification Search
CPC ........ F16H 61/0213; F16H 2061/0081; B60W 2050/0057
USPC .......................................................... 706/905
See application file for complete search history.

(56) References Cited

U.S. PATENT DOCUMENTS

| 6,697,708 B2 * | 2/2004 | Takagi et al. ................. 700/245 |
| 8,527,434 B2 * | 9/2013 | Noda et al. ..................... 706/12 |
| 2004/0013295 A1 * | 1/2004 | Sabe et al. ..................... 382/153 |
| 2005/0149228 A1 * | 7/2005 | Lee ............................... 700/245 |
| 2009/0234467 A1 * | 9/2009 | Sabe ................. G05B 13/0265 700/29 |
| 2010/0092267 A1 * | 4/2010 | Najdovski et al. ............... 414/7 |
| 2010/0318478 A1 * | 12/2010 | Yoshiike ................ G06N 3/006 706/12 |
| 2010/0318479 A1 * | 12/2010 | Noda et al. ..................... 706/12 |
| 2011/0010176 A1 * | 1/2011 | Yoshiike .............. G06N 99/005 704/256.2 |

(Continued)

FOREIGN PATENT DOCUMENTS

| JP | 2000-271347 | 10/2000 |
| JP | 2006-288951 | 10/2006 |

(Continued)

OTHER PUBLICATIONS

Possibilities for Learning in Game Artificial Intelligence, by Jacobsen et al., published 2009.*

(Continued)

*Primary Examiner* — David R Vincent
(74) *Attorney, Agent, or Firm* — Chip Law Group

(57) ABSTRACT

Provided is an information processing apparatus including a learning part performing learning of a model of an environment in which an agent performs action, using an observed value observed in the agent when the agent capable of action performs action, an action determining part determining action to be performed by the agent, based on the model, and a user instruction output part outputting instruction information representing an instruction from a user according to the instruction from the user, wherein the action determining part determines the action performed by the agent according to the instruction information when there is an instruction from the user.

15 Claims, 20 Drawing Sheets

(56) References Cited

U.S. PATENT DOCUMENTS

| | | | | |
|---|---|---|---|---|
| 2011/0060708 A1* | 3/2011 | Suzuki | ............... | G06N 99/005 |
| | | | | 706/12 |
| 2012/0084237 A1* | 4/2012 | Hasuo et al. | ................... | 706/12 |
| 2012/0150352 A1* | 6/2012 | Park | ............................. | 700/264 |
| 2013/0066816 A1* | 3/2013 | Shimomura et al. | ........... | 706/12 |

FOREIGN PATENT DOCUMENTS

| | | |
|---|---|---|
| JP | 2007-75467 | 3/2007 |
| JP | 2007-312848 | 12/2007 |
| JP | 2007-319560 | 12/2007 |

OTHER PUBLICATIONS

AI for Dynamic Team-mate Adaptation in Games, by Abraham, published 2010.*
Real-time team-mate AI in Games, by McGee, published 2010.*
Learning to play Mario, by Mohan, published 2009.*
The 2009 Mario AI Competition, by Togelius, published 2010.*
Incorporating Advice into Agents that Learn from Reinforcements, by Maclin, published 1994.*

\* cited by examiner

STATE TRANSITION
PROBABILITY A

EXISTING HMM

EXTENDED HMM

FIG.10A

OBSERVATION PROBABILITY B

STATE $S_i$

| | $O_1$ | $O_2$ | $O_3$ |
|---|---|---|---|
| $S_1$ | 0.1 | 0.2 | 0.7 |
| $S_2$ | 0.1 | 0.8 | 0.1 |
| $S_3$ | 0.2 | 0.0 | 0.8 |
| $S_4$ | 0.1 | 0.7 | 0.2 |
| $S_5$ | 0.9 | 0.1 | 0.0 |

OBSERVED VALUE $O_k$

FIG.10B $O_1 = \{S_5\}$
$O_2 = \{S_2, S_4\}$
$O_3 = \{S_1, S_3\}$

OBSERVED VALUE $O_k$

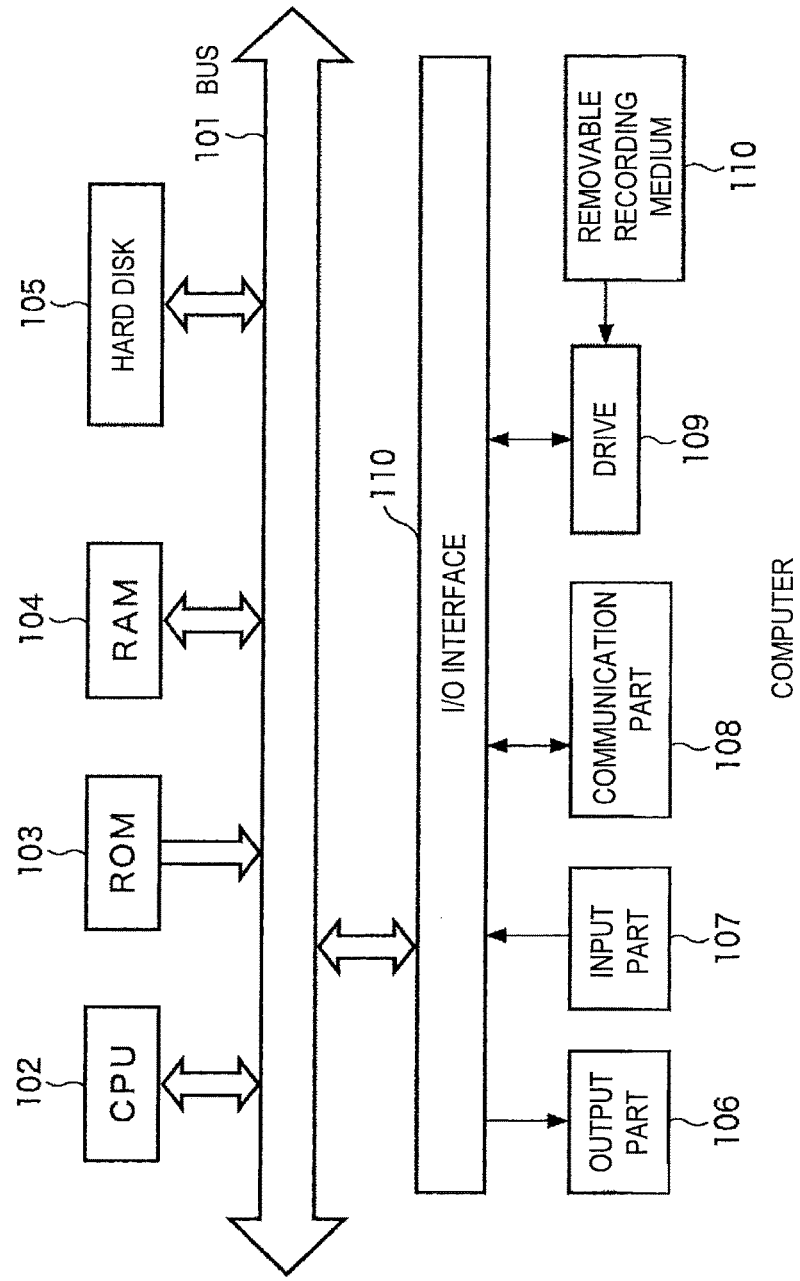

INFORMATION PROCESSING TO PROVIDE ENTERTAINING AGENT FOR A GAME CHARACTER

BACKGROUND

The present technology relates to an information processing apparatus, an information processing method and a program, and specifically relates to an information processing apparatus, an information processing method and a program capable of providing an entertaining agent applicable to a character of a game or the like, for example.

As for a game (video game), basically, a designer creates content of the game in advance and packages it as a program (see, Japanese Patent Application Publication No. 2007-319560 which is hereinafter referred to as Patent Literature 1, Japanese Patent Application Publication No. 2007-312848 which is hereinafter referred to as Patent Literature 2, Japanese Patent Application Publication No. 2007-75467 which is hereinafter referred to as Patent Literature 3, Japanese Patent Application Publication No. 2006-288951 which is hereinafter referred to as Patent Literature 4, and Japanese Patent Application Publication No. 2000-271347 which is hereinafter referred to as Patent Literature 5).

In an adventure game, for example, all of the world of the game as its stage, a scenario, behavior of a character, and the like are designed in advance and packaged.

SUMMARY

A character is expected to appear which is a character not created in advance but autonomously growing up like a real human and differently having performance (property) depending on a manner of growing by a user so as not to bore the user in the game, for example.

The present technology is devised in view of these circumstances, and it is desirable to provide an entertaining agent, for example, being a character not boring a user.

According to one embodiment of the present technology, there is provided an information processing apparatus or a program causing a computer as an information processing apparatus, including: a learning part performing learning of a model of an environment in which an agent performs action, using an observed value observed in the agent when the agent capable of action performs action; an action determining part determining action to be performed by the agent, based on the model; and a user instruction output part outputting instruction information representing an instruction from a user according to the instruction from the user, wherein the action determining part determines the action performed by the agent according to the instruction information when there is an instruction from the user.

According to one embodiment of the present technology, there is provided an information processing method, including, in an information processing apparatus having: a learning part performing learning of a model of an environment in which an agent performs action, using an observed value observed in the agent when the agent capable of action performs action; an action determining part determining action to be performed by the agent, based on the model; and a user instruction output part outputting instruction information representing an instruction from a user according to the instruction from the user, by the action determining part, determining the action performed by the agent according to the instruction information when there is an instruction from the user.

In the one embodiment as above, learning of a model of an environment in which an agent performs action, using an observed value observed in the agent when the agent capable of action performs action is performed; whereas action performed by the agent based on the model is determined. However, when there is an instruction from a user, instruction information representing the instruction from the user according to the instruction from the user is outputted, and the action performed by the agent according to the instruction information is determined.

In addition, the information processing apparatus may be an independent apparatus, or an internal block constituting one apparatus.

Moreover, the program can be provided by transmitting via a transmission medium, or by recoding in a recording medium.

According to the one embodiment of the present technology, an entertaining agent can be provided.

BRIEF DESCRIPTION OF THE DRAWINGS

FIGS. 10A and 10B are diagrams for explaining processing of the open end detecting part 37 listing states $S_i$ in which an observed value $O_k$ is observed with a probability equal to or higher than a threshold value;

FIG. 20 is a block diagram illustrating an example of a configuration of one embodiment of a computer to which the present technology is applied.

DETAILED DESCRIPTION OF THE EMBODIMENTS

Figure 1:
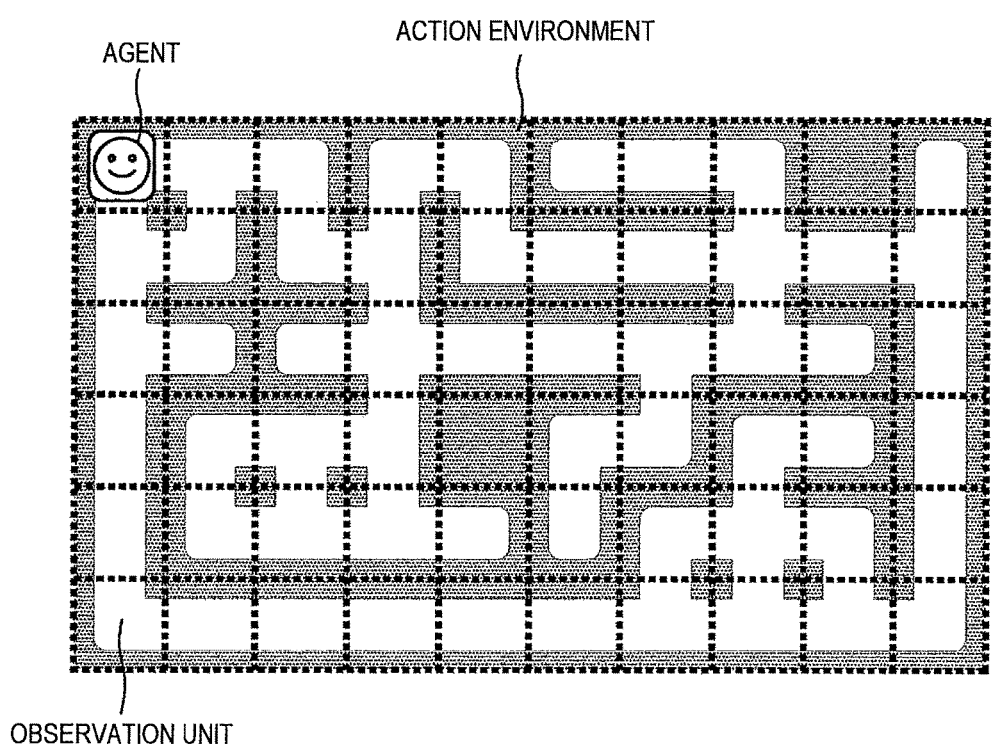
FIG. 1 is a diagram illustrating an action environment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

(Environment in which Agent Performs Actions)

FIG. 1 is a diagram illustrating an example of an action environment as an environment in which an agent to which an information processing apparatus according to the present technology is applied performs actions.

The agent is a device such, for example, as a robot (which may be a robot acting in the real world or may be a virtual robot acting in a virtual world) capable of autonomously performing actions (behavior) such as movement and the like (capable of action).

The agent is can change states of the agent itself by performing the actions, and observe externally observable information and recognize the states using observed values as results of the observation.

Moreover, the agent constructs a model of the action environment (environment model) in which the agent performs the actions, in order to recognize the states and determine (select) an action to be performed in each state.

In FIG. 1, the action environment is a labyrinth in a two-dimensional plane, and the agent can move in hollow parts in the figure as a passage.

(Actions Performed by Agent and Observed Values Observed by Agent)

Figures 2A, 2B:
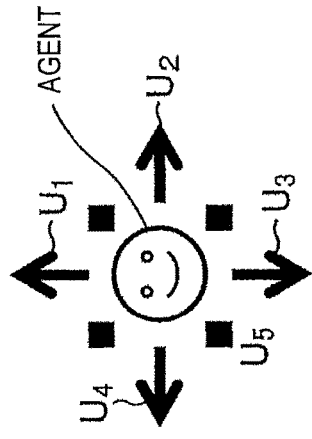
FIGS. 2A and 2B are diagrams illustrating actions performed by an agent and observed values observed by the agent.

FIGS. 2A and 2B illustrate an example of the actions performed by the agent and the observed values observed by the agent in the action environment.

In the action environment as illustrated in FIG. 1, the agent sets areas divided in the form of squares indicated by dotted lines in the figure as units in which the observed values are observed (observation units), and performs the actions of moving in the observation units.

FIG. 2A illustrates kinds of the actions performed by the agent.

In FIG. 2A, the agent can perform five actions $U_1$ to $U_5$ in total, in the figure, the action $U_1$ being moving in an upward direction by an observation unit, the action $U_2$ being moving in a right direction by an observation unit, the action $U_3$ being moving in a downward direction by an observation unit, the action $U_4$ being moving in a left direction by an observation unit, and the action $U_5$ being not moving (doing nothing).

FIG. 2B schematically illustrates kinds of the observed values observed by the agent in observation units.

In the present embodiment, the agent observes one of 15 kinds of observed values (symbols) $O_1$ to $O_{15}$ in observation units.

The observed value $O_1$ is observed in an observation unit having a wall at the top, bottom, and left and having a passage at the right. The observed value $O_2$ is observed in an observation unit having a wall at the top, left, and right and having a passage at the bottom.

The observed value $O_3$ is observed in an observation unit having a wall at the top and left and having a passage at the bottom and right. The observed value $O_4$ is observed in an observation unit having a wall at the top, bottom, and right and having a passage at the left.

The observed value $O_5$ is observed in an observation unit having a wall at the top and bottom and having a passage at the left and right. The observed value $O_6$ is observed in an observation unit having a wall at the top and right and having a passage at the bottom and left.

The observed value $O_7$ is observed in an observation unit having a wall at the top and having a passage at the bottom, left, and right. The observed value $O_8$ is observed in an observation unit having a wall at the bottom, left, and right and having a passage at the top.

The observed value $O_9$ is observed in an observation unit having a wall at the bottom and left and having a passage at the top and right. The observed value $O_{10}$ is observed in an observation unit having a wall at the left and right and having a passage at the top and bottom.

The observed value $O_{11}$ is observed in an observation unit having a wall at the left and having a passage at the top, bottom, and right. The observed value $O_{12}$ is observed in an observation unit having a wall at the bottom and right and having a passage at the top and left.

The observed value $O_{13}$ is observed in an observation unit having a wall at the bottom and having a passage at the top, left, and right. The observed value $O_{14}$ is observed in an observation unit having a wall at the right and having a passage at the top, bottom, and left.

The observed value $O_{15}$ is observed in an observation unit having a passage at all of the top, bottom, left, and right.

In addition, an action $U_m$ (m=1, 2, . . . M (M is a total number of actions (kinds of actions))) and an observed value $O_k$ (k=1, 2, . . . K (K is a total number of observed values)) are each a discrete value.

(One Embodiment of Agent)

Figure 3:
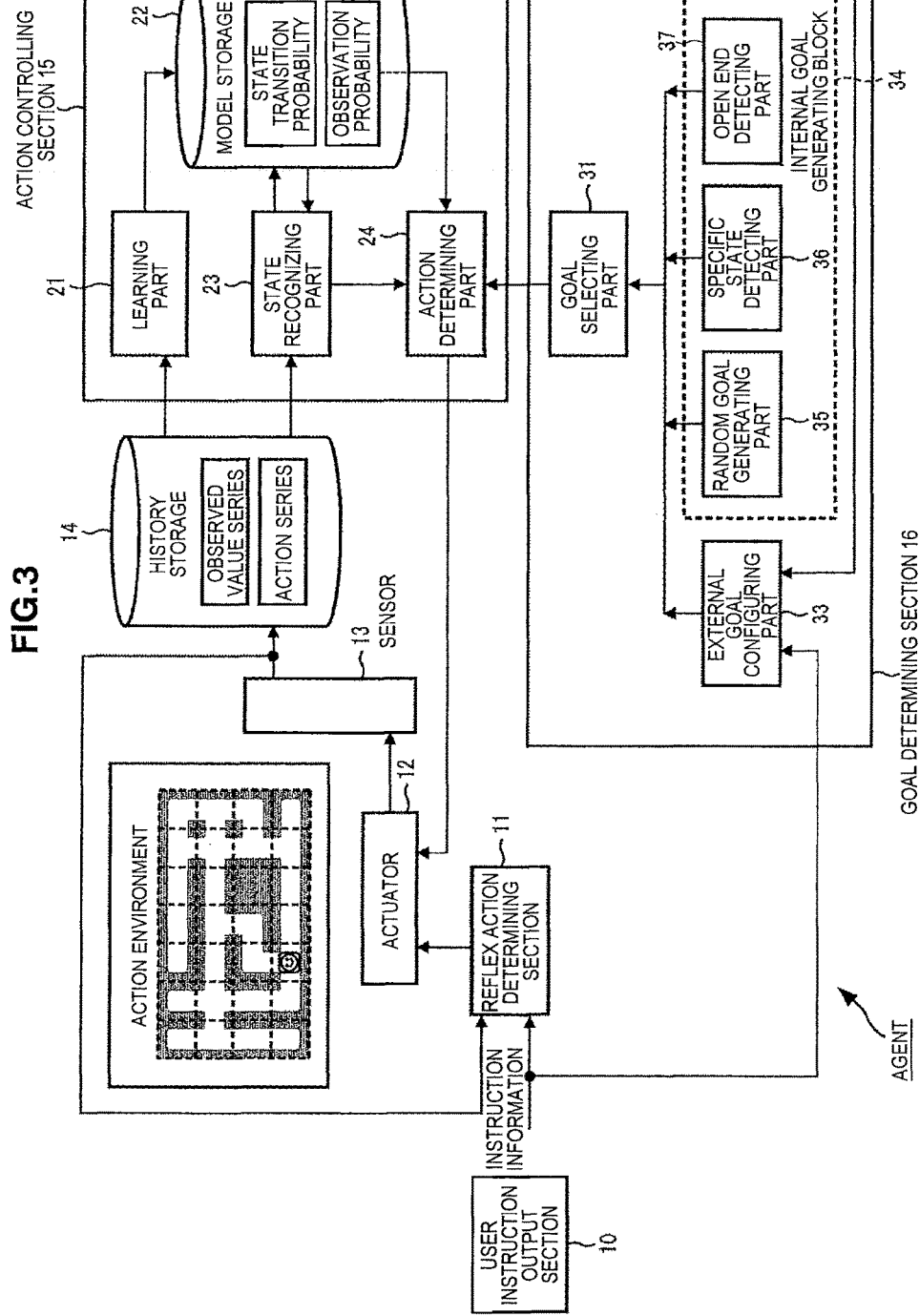
FIG. 3 is a block diagram illustrating an example of a configuration of one embodiment of the agent to which an information processing apparatus according to the present technology is applied.

FIG. 3 is a block diagram illustrating an example of a configuration of one embodiment of the agent to which an information processing apparatus according to the present technology is applied.

The agent obtains an environment model resulting from modeling the action environment by learning.

Moreover, the agent recognizes present states (circumstances) of the agent itself using a series of observed values (observed value series).

Furthermore, the agent makes (creates) a plan of actions (action plan) to be performed to move from the present place (present state) to a certain goal, and determines an action to be performed next according to the action plan.

In addition, the learning, recognition of states, and making of an action plan (determination of actions) that are performed by the agent can be applied to not only a problem (task) of the agent moving to the top, bottom, left, or right in observation units but also a problem that is generally taken up as a problem of reinforcement learning and that is capable of formulation in the framework of a Markov decision process (MDP).

In FIG. 3, the agent moves in observation units by performing an action $U_m$ illustrated in FIG. 2A in the action environment, and obtains an observed value $O_k$ observed in an observation unit after the movement.

Then, the agent learns the action environment (its structure (environment model resulting from modeling this)) and determines an action to be performed next using an action series, which is a series of actions $U_m$ (symbols representing these) performed up to now, and an observed value series, which is a series of observed values $O_k$ (symbols representing these) observed up to now.

Modes in which the agent performs actions includes a reflex action mode (reflex behavior mode) and a recognition action mode (recognition behavior mode).

In the reflex action mode, a rule for determining an action to be performed next from the observed value series and the action series obtained in the past is previously designed as an innate rule. And the action is determined according to the innate rule.

Herein, as the innate rule, a rule for determining an action so as not to hit a wall (allowing to-and-fro movement in a passage) or a rule for determining an action so as not to hit a wall and so as not to retrace a taken path until coming to a dead end, for example, can be employed.

According to the innate rule, the agent repeats determining an action to be performed next for an observed value observed in the agent and observing an observed value in an observation unit after performing the action.

Thereby, the agent obtains an action series and an observed value series when having moved in the action environment. The action series and the observed value series thus obtained in the reflex action mode are used to learn the action environment.

In the recognition action mode, the agent determines a goal, recognizes present states, and determines an action plan for achieving the goal from the present conditions. Then, the agent determines an action to be performed next according to the action plan. In addition, also in the reflex action mode, an action series and an observed value series can be obtained and used for learning the action environment.

In FIG. 3, the agent includes a user instruction output section 10, a reflex action determining section 11, an actuator 12, a sensor 13, a history storage 14, an action controlling section 15, and a goal determining section 16.

When a user inputs an instruction to the agent by operating an operation part such, for example, as a remote commander, the user instruction output section 10 outputs instruction information representing the instruction, in response to the instruction from the user.

The instruction information which the user instruction output section 10 outputs is supplied to the reflex action determining section 11 and the goal determining section 16.

The reflex action determining section 11 is supplied with an observed value observed in the action environment and outputted by the sensor 13 as well as the instruction information from the user instruction output section 10.

The reflex action determining section 11 in the reflex action mode determines an action to be performed next for the observed value supplied from the sensor 13 according to the innate rule, and controls the actuator 12.

In addition, the reflex action determining section 11 determines an action to be performed next preferentially according to the instruction information when the instruction information is supplied from the user instruction output section 10.

The actuator 12 is driven according to control of the reflex action determining section 11 or an action determining part 24 mentioned below. By the actuator being driven, in the action environment, the agent performs the action determined by the reflex action determining section 11 or the action determining part 24, that is, for example, movement in a labyrinth as the action environment.

The sensor 13 senses externally observable information and outputs an observed value as the result of the sensing.

Namely, the sensor 13 observes an observation unit in which the agent is located in the action environment and outputs a symbol representing the observation unit as the observed value.

In addition, in FIG. 3, the sensor 13 also observes the actuator 12 and thereby, outputs an action performed by the agent (symbol representing it).

The observed value outputted by the sensor 13 is supplied to the reflex action determining section 11 and the history storage 14.

The history storage 14 sequentially stores the observed value and the action outputted by the sensor 13. Thereby, the history storage 14 stores a series of observed values (observed value series) and a series of actions (action series).

In addition, a symbol representing an observation unit in which the agent is located is employed as an externally observable observed value in this case, whereas a set of a symbol representing an observation unit in which the agent is located and a symbol representing an action performed by the agent can be employed as the observed value.

The action controlling section 15 learns a state transition probability model as an environment model for making the structure of the action environment stored (obtained), using the observed value series and the action series stored in the history storage 14.

Moreover, the action controlling section 15 calculates an action plan on the basis of the state transition probability model after learning. Furthermore, the action controlling section 15 determines an action to be performed next by the agent according to the action plan, and controls the actuator 12 according to the action, thereby having the agent perform the action.

Namely, the action controlling section 15 includes a learning part 21, a model storage 22, a state recognizing part 23, and the action determining part 24.

The learning part 21 learns the state transition probability model stored in the model storage 22 using the action series and the observed value series stored in the history storage 14.

Herein, the state transition probability model learned as an object by the learning part 21 is a state transition probability model defined by state transition probability for each action at which a state makes a state transition due to an action performed by the agent and observation probability at which a predetermined observed value is observed from a state.

The state transition probability model can includes, for example, an HMM (Hidden Markov Model). However, the state transition probability of an ordinary HMM is not present for each action. Accordingly, in the present embodiment, the state transition probability of the HMM (Hidden Markov Model) is extended to state transition probability for each action performed by the agent. The HMM having state transition probability thus extended (also referred to as an extended HMM) is employed as an object for learning by the learning part 21.

In addition, the state transition probability model can employ an ordinary HMM (HMM not having state transition probability for each action). However, when the state transition probability model employs the ordinary HMM, learning for associating a state transition of the HMM with an action to be performed by the agent (learning, for a controller, of a function and the like outputting the action to be performed for causing a state transition, setting the state transition as an input) should be performed. For example, Japanese Patent No. 4596024, which the Applicants have already proposed, describes a method of the learning for associating a state transition of the HMM with an action performed by the agent.

The model storage 22 stores the extended HMM (state transition probability, observation probability and the like as model parameters defining it).

The state recognizing part 23 in the recognition action mode obtains (recognizes) the state of the agent at the present time, that is, a present state as a state in the extended HMM at the present time, on the basis of the extended HMM stored in the model storage 22 using the action series and the observed value series stored in the history storage 14.

Then, the state recognizing part 23 supplies the present state to the action determining part 24.

The action determining part 24 functions as a planner for planning actions to be performed by the agent in the recognition action mode.

Namely, the action determining part 24 is supplied with the present state from the state recognizing part 23, and is also supplied with one of states of the extended HMM stored in the model storage 22 as a goal state as a goal from the goal determining section 16.

The action determining part 24 calculates (determines) an action plan as a series of actions that maximizes the likelihood of state transition from the present state from the state recognizing part 23 to the goal state from the goal determining section 16 on the basis of the extended HMM stored in the model storage 22.

Furthermore, the action determining part 24 determines an action to be performed next by the agent according to the action plan, and controls the actuator 12 according to the determined action.

The goal determining section 16 in the recognition action mode determines the goal state, and then supplies the goal state to the action determining part 24.

Namely, the goal determining section 16 includes a goal selecting part 31, an external goal configuring part 33, and an internal goal generating block 34.

The goal selecting part 31 is supplied with an external goal from the external goal configuring part 33 and an internal goal from the internal goal generating block 34.

The goal selecting part 31 selects the state as the external goal from the external goal configuring part 33 or the state as the internal goal from the internal goal generating block 34, and determines the selected state as a goal state to supply to the action determining part 24.

In addition, the goal selecting part 31 is supplied with the state as the external goal from the external goal configuring part 33, and also, when supplied with the state as the internal goal from the internal goal generating block 34, selects the state as the external goal from the external goal configuring part 33 more preferentially than the state as the internal goal from the internal goal generating block 34, as the goal state.

The external goal configuring part 33 is supplied with the instruction information from the user instruction output section 10.

The external goal configuring part 33 configures the state of the extended HMM according to the instruction information from the user instruction output section 10 as the external goal that is determined according to the external instruction to supply to the goal selecting part 31.

The internal goal generating block 34 obtains the state of the extended HMM as the internal goal obtained inside (the agent) to supply to the goal selecting part 31.

Namely, the internal goal generating block 34 includes a random goal generating part 35, a specific state detecting part 36, and an open end detecting part 37.

The random goal generating part 35 randomly selects one state from the states of the extended HMM stored in the model storage 22 as a random goal, and supplies the random goal as an internal goal (one of the internal goals) to the goal selecting part 31.

The specific state detecting part 36 detects a predetermined state from among the states of the extended HMM stored in the model storage 22 as a specific state to supply to the goal selecting part 31 as an internal goal (one of the internal goals).

The open end detecting part 37 detects, as an open end, a state in which there is any state transition not yet made among state transitions that can be made from another state in which a predetermined observed value is observed as a transition source in the extended HMM stored in the model storage 22 and in which the same observed value as the predetermined observed value is observed. Then, the open end detecting part 37 supplies the open end as an internal goal (one of the internal goals) to the goal selecting part 31.

(Processing in Reflex Action Mode)

Figure 4:
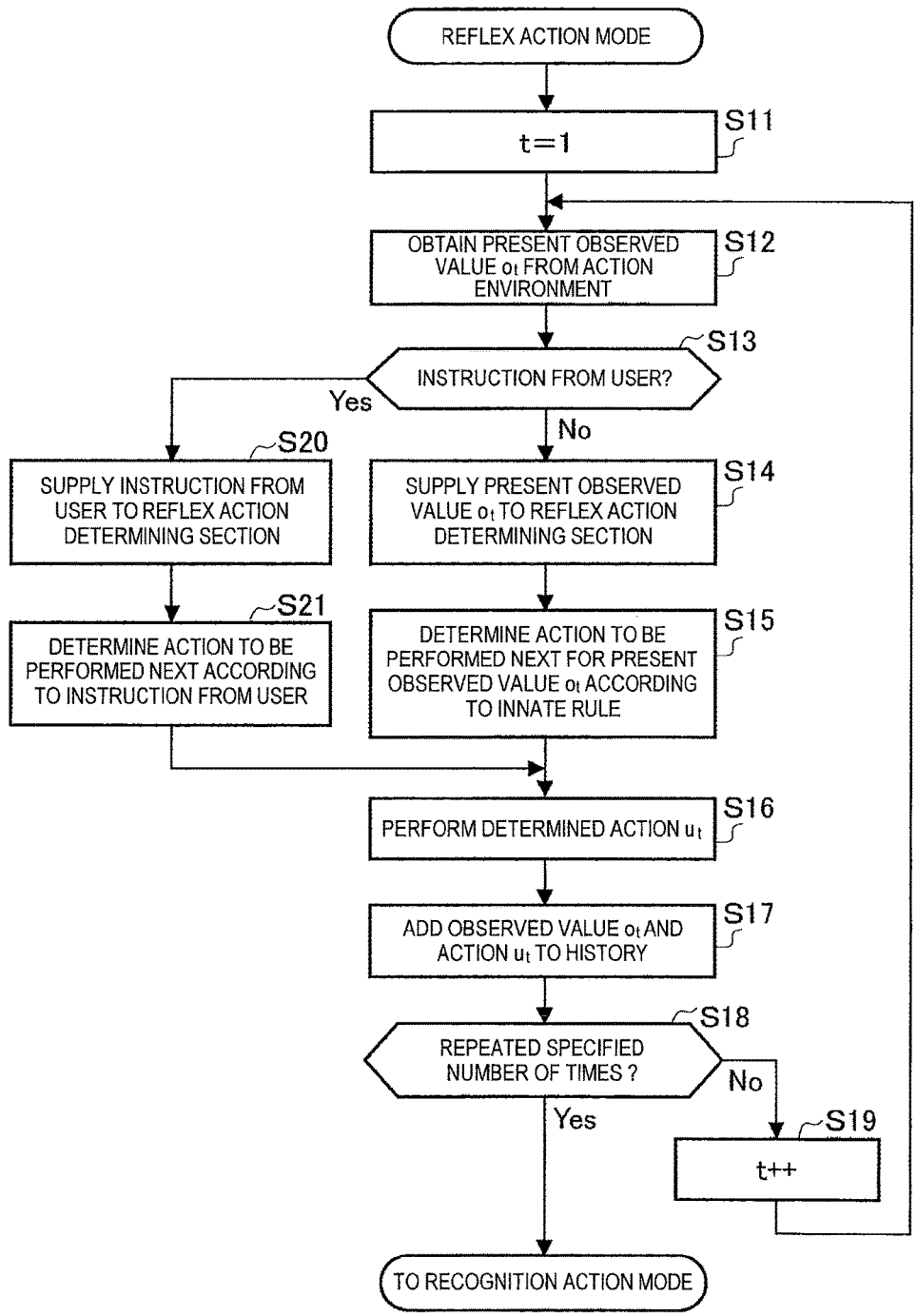
FIG. 4 is a flowchart for explaining processing in a reflex action mode.

FIG. 4 is a flowchart for explaining processing in the reflex action mode performed by the agent in FIG. 3.

In step S11, the reflex action determining section 11 configures a variable t for counting time to 1, for example, as an initial value. The process proceeds to step S12.

In step S12, the sensor 13 obtains a present observed value (observed value at time t) $o_t$ from the action environment to output. The process proceeds to step S13.

Herein, the observed value $o_t$ at time t in the present embodiment is one of the 15 observed value $O_1$ to $O_{15}$ illustrated in FIG. 2B.

In step S13, the user instruction output section 10 decides whether there is an instruction from the user.

In step S13, when it is decided that there is no instruction from the user, the process proceeds to step S14, where the agent supplies the observed value $o_t$ which the sensor 13 outputs to the reflex action determining section 11, and the process proceeds to step S15.

In step S15, the reflex action determining section 11 determines an action $u_t$ to be performed at time t for the observed value $o_t$ from the sensor 13 according to the innate rule, and controls the actuator 12 according to the action $u_t$. The process proceeds to step S16.

Herein, the action $u_t$ at time t in the present embodiment is one of the five actions $U_1$ to $U_5$ illustrated in FIG. 2A.

Moreover, the action $u_t$ determined as the action to be performed next by the agent will hereinafter be referred to also as a determined action $u_t$.

In step S16, the actuator 12 is driven under control of the reflex action determining section 11. Thereby, the agent performs the determined action $u_t$.

At this time, the sensor 13 observes the actuator 12, and outputs the action $u_t$ performed by the agent (symbol representing it).

Then, the process proceeds from step S16 to step S17, where the history storage 14 stores the observed value $o_t$ and the action $u_t$ outputted by the sensor 13 in a form of being added to a series of observed values and actions already stored as a history of observed values and actions. The process proceeds to step S18.

In step S18, the reflex action determining section 11 decides whether the agent has performed actions a certain number of times specified (configured) in advance as the number of actions to be performed in the reflex action mode.

In step S18, when it is decided that the agent has not yet performed actions the number of times specified in advance, the process proceeds to step S19, where the reflex action determining section 11 increments time t by one. Then, the process returns from step S19 to step S12 to thereafter be repeated similarly.

Moreover, in step S18, when it is decided that the agent has performed action the number of times specified in advance, that is, when time t is equal to the number of times specified in advance, the processing in the reflex action mode is terminated and processing in the recognition action mode is initiated. The processing in the recognition action mode is described later.

On the other hand, in step S13, when it is decided that there is an instruction from the user, that is, when the user performs an instruction specifying a position of a moving destination of the agent, an instruction specifying a moving direction of it, or the like, the process proceeds to step S20, where the user instruction output section 10 supplies instruction information representing the instruction of the user to the reflex action determining section 11, and the process proceeds to step S21.

In step S21, the reflex action determining section 11, according to the instruction information from the user instruction output section 10, determines an action of moving in the direction toward the position of the moving destination of the agent which the instruction information represents or an action of moving in the moving direction which the instruction information represents as an action to be performed next (determined action) $u_t$, and according to the determined action $u_t$, controls the actuator 12. The process proceeds to step S16.

In step S16, the actuator 12 is driven under control of the reflex action determining section 11. Thereby, the agent performs the determined action $u_t$.

At this time, the sensor 13 observes the actuator 12, and outputs the action $u_t$ performed by the agent (symbol representing it).

Then, the process proceeds from step S16 to step S17, where the history storage 14 stores the observed value $o_t$ and the action $u_t$ outputted by the sensor 13 in a form of being added to the series of observed values and actions already stored as the history of observed values and actions. After that, the process proceeds to step S18 and the process similar to the above description is performed.

As above, in the reflex action mode, as long as there is no instruction of the user, the agent determines actions to be performed next according to the innate rule and performs the actions. Whereas, when there is an instruction of the user, it determines an action to be performed next preferentially according to the instruction of the user and performs the action.

The series of observed values $o_t$ (observed value series) observed in the agent performing the actions according to the innate rule or the instruction of the user and the series of actions $u_t$ performed by the agent when the observed values $o_t$ are observed (action series) (the series of actions $u_t$ and the series of values $o_{t+1}$ observed in the agent when the actions $u_t$ have been performed) are stored in the history storage 14.

Then, the learning part 21 in the agent learns the extended HMM using the observed value series and the action series stored in the history storage 14 as learning data.

In the extended HMM, the state transition probability of an ordinary (existing) HMM is extended to state transition probability for each action performed by the agent.

(Extended HMM)

Figure 5A:
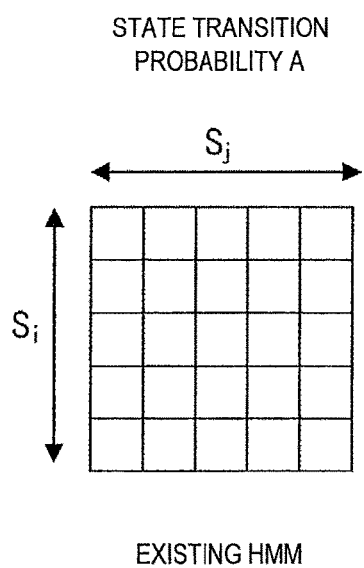
FIGS. 5A and 5B are diagrams for explaining state transition probability of an extended HMM.
Figure 5B:
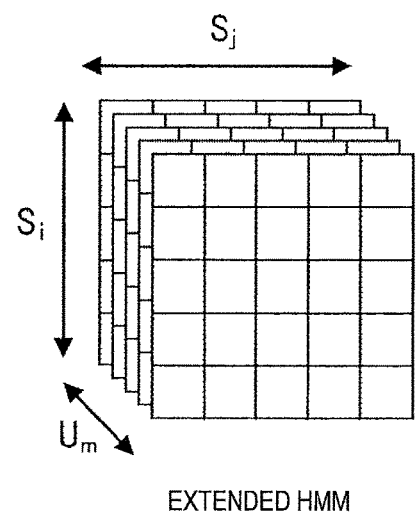

FIGS. 5A and 5B are diagrams for explaining the state transition probability of the extended HMM.

Namely, FIG. 5A schematically illustrates the state transition probability of an ordinary HMM.

Now suppose that an ergodic HMM in which a state transition from a certain state to an arbitrary state is possible is employed as HMMs including the extended HMM. Also suppose that the number of states of an HMM is N.

In this case, the ordinary HMM has the state transition probabilities $a_{ij}$ of N×N state transitions from each of N states $S_i$ to each of N states $S_j$ as a model parameter.

All the state transition probabilities of the ordinary HMM can be represented by a two-dimensional table in which the state transition probability $a_{ij}$ of a state transition from a state $S_i$ to a state $S_j$ is disposed in an ith row from the top and a jth column from the left.

Herein, the table of state transition probabilities of an HMM will be described also as state transition probability A.

FIG. 5B illustrates the state transition probability A of the extended HMM.

The extended HMM has state transition probabilities for each action $U_m$ performed by the agent.

Herein, the state transition probability of a state transition from a state $S_i$ to a state $S_j$ with respect to a certain action $U_m$ will hereinafter be described also as $a_{ij}(U_m)$.

The state transition probability $a_{ij}(U_m)$ represents a probability of a state transition occurring from a state $S_i$ to a state $S_j$ when the agent performs an action $U_m$.

All the state transition probabilities of the extended HMM can be represented by a three-dimensional table in which the state transition probability $a_{ij}(U_m)$ of a state transition from a state $S_i$ to a state $S_3$ with respect to an action $U_m$ is disposed in an ith row from the top, a jth column from the left, and an mth plane in a direction of depth from the front side.

Hereinafter, in the three-dimensional table of the state transition probability A, an axis in a vertical direction will be referred to as an i-axis, an axis in a horizontal direction a j-axis, and an axis in the direction of depth an m-axis or an action axis.

In addition, a plane composed of state transition probabilities $a_{ij}(U_m)$ which plane is obtained by cutting the three-dimensional table of the state transition probability A with a plane perpendicular to the action axis at a position m on the action axis will be referred to also as a state transition probability plane with respect to an action $U_m$.

Furthermore, a plane composed of state transition probabilities $a_{ij}(U_m)$ which plane is obtained by cutting the three-dimensional table of the state transition probability A with a plane perpendicular to the i-axis at a position I on the i-axis will be referred to also as an action plane with respect to a state $S_I$.

The state transition probabilities $a_{Ij}$ ($U_m$) forming the action plane with respect to the state $S_I$ represent a probability of each action $U_m$ being performed when a state transition occurs with the state $S_I$ as a transition source.

In addition, as with the ordinary HMM, the extended HMM has not only the state transition probability $a_{ij}(U_m)$ for each action but also initial state probability $\pi_i$ of being in a state $S_i$ at an initial time t=1 and observation probability $b_i(O_k)$ of an observed value $O_k$ being observed in the state $S_i$ as model parameters of the extended HMM.

(Learning of Extended HMM)

Figure 6:
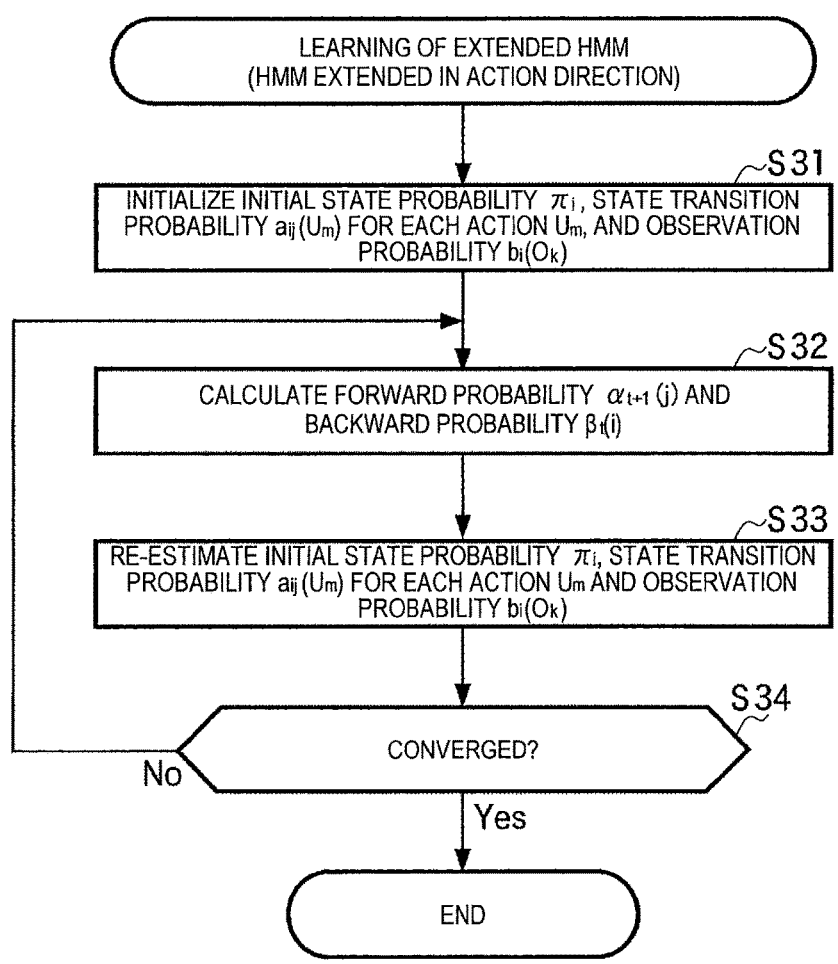
FIG. 6 is a flowchart for explaining processing of learning of the extended HMM.

FIG. 6 is a flowchart for explaining processing of learning of the extended HMM which is performed by the learning part 21 in FIG. 3 using the observed value series and the action series as learning data stored in the history storage 14.

In processing of the reflex action mode and a recognition action mode of the agent, the history storage 14 stores the series of the observed values and the actions as a history of observed values and actions.

When the history storage 14 newly stores a series of observed values and actions, the learning part 21 performs learning of the extended HMM using the new observed value series and action series as learning data.

Namely, in step S31, the learning part 21 initializes the extended HMM.

Specifically, the learning part 21 initializes the initial state probability $\pi_i$, the state transition probability $a_{ij}(U_m)$ (for each action), and the observation probability $b_i(O_k)$ as model parameters of the extended HMM stored in the model storage 22.

In addition, supposing that the number (total number) of states of the extended HMM is N, the initial state probability it is initialized to 1/N, for example. Herein, supposing that the action environment, which is a labyrinth in a two-dimensional plane, is composed of a×b observation units horizontally and vertically, respectively, the number of (a+Δ)×(b+Δ) states, where Δ is an integer as a margin, can be employed as the number N of states of the extended HMM.

Moreover, the state transition probability $a_{ij}(U_m)$ and the observation probability $b_i(O_k)$ are initialized to a random value that can be assumed as a probability value, for example.

Herein, the state transition probability $a_{ij}(U_m)$ is initialized such that a sum total of state transition probabilities $a_{ij}(U_m)$ of each row in a state transition probability plane with respect to each action $U_m$ ($a_{i,1}(U_m)+a_{i,2}(U_m)+ \ldots +a_{i,N}(U_m)$) is 1.0.

Similarly, the observation probability $b_i(O_k)$ is initialized such that a sum total of observation probabilities of observed values $O_1, O_2, \ldots, O_K$ being observed from each state $S_i$ with respect to each state $S_i(b_i(O_1)+b_i(O_2)+ \ldots +b_i(O_K))$ is 1.0.

In addition, when so-called incremental learning is performed, the initial state probability $\pi_i$, the state transition probability $a_{ij}(U_m)$, and the observation probability $b_i(O_k)$ of the extended HMM stored in the model storage 22 are used as initial values as they are. That is, the initialization in step S31 is not performed (skipped).

After step S31, the process proceeds to step S32. From step S32 on down, the learning of the extended HMM is performed which estimates the initial state probability $\pi_i$, the state transition probability $a_{ij}(U_m)$ for each action, and the observation probability $b_i(O_k)$ according to a Baum-Welch re-estimation method (method obtained by extending it with respect to action) using the action series and the observed value series as learning data stored in the history storage 14.

Namely, in step S32, the learning part 21 calculates forward probability $\alpha_{t+1}(j)$ and backward probability $\beta_t(i)$.

Herein, in the extended HMM, when an action $u_t$ is performed at time t, a state transition occurs from the present state $S_i$ to a state $S_j$, and an observed value $\alpha_{t+1}$ is observed in the state $S_j$ after the state transition at next time t+1.

In such an extended HMM, the forward probability $\alpha_{t+1}(j)$ is probability P ($o_1, o_2, \ldots, o_{t+1}, u_1, u_2, \ldots, s_{t+1}=j|\Lambda$) of the action series $u_1, u_2, \ldots, u_t$ of the learning data being observed, the observed value series $o_1, o_2, \ldots, o_{t+1}$ being observed, and being in the state $S_j$ at time t+1 in a model $\Lambda$, which is the present extended HMM (extended HMM defined by the initial state probability $\pi_i$, the state transition probability $a_{ij}(U_m)$, and the observation probability $b_i(O_k)$ actually stored in the model storage 22). And it is expressed by equation (1).

$$\alpha_{t+1}(j) = P(o_1, o_2, \cdots, o_{t+1}, u_1, u_2, \cdots, u_t, s_{t+1} = j | \Lambda) \quad (1)$$
$$= \sum_{i=1}^{N} \alpha_t(i) a_{ij}(u_t) b_j(o_{t+1})$$

In addition, a state $s_t$ represents a state at time t, and is one of states $S_i$ to $S_N$ when the number of states of the extended HMM is N. Moreover, an equation $s_{t+1}=j$ denotes that a state $s_{t+1}$ at time t+1 is a state $S_j$.

The forward probability $\alpha_{t+1}(j)$ of equation (1) represents a probability of being in a state $S_j$ at time t+1 and observing an observed value $o_{t+1}$ after a state transition is effected by performing (observing) an action $u_t$ when observing the action series $u_1, u_2, \ldots, u_{t-1}$ and the observed value series $o_1, o_2, \ldots, o_t$ of the learning data and being in a state $s_t$ at time t.

In addition, the initial value $\alpha_1(j)$ of the forward probability $\alpha_{t+1}(j)$ is expressed by equation (2).

$$\alpha_1(j) = \pi_j b_j(o_1) \quad (2)$$

The initial value $\alpha_1(j)$ of equation (2) represents a probability of being in the state $S_j$ at first (time t=0) and observing an observed value $o_1$.

Moreover, in the extended HMM, the backward probability $\beta_t(i)$ is probability P ($o_{t+1}, o_{t+2}, \ldots, o_T, u_{t+1}, u_{t+2}, \ldots, u_{T-1}, s_t=i|\Lambda$) of being in a state $S_i$ at time t, and thereafter observing the action series $u_{t+1}, u_{t+2}, \ldots, u_{T-1}$ of the learning data and observing the observed value series $o_{t+1}, o_{t+2}, \ldots, o_T$ in the model $\Lambda$, which is the present extended HMM. And it is expressed by equation (3).

$$\beta_t(i) = P(o_{t+1}, o_{t+2}, \cdots, o_T, u_{t+1}, u_{t+2}, \cdots, u_{T-1}, s_t = j | \Lambda) \quad (3)$$
$$= \sum_{j=1}^{N} a_{ij}(u_t) b_j(o_{t+1}) \beta_{t+1}(j)$$

In addition, T denotes the number of observed values of the observed value series of the learning data.

The backward probability $\beta_t(i)$ of equation (3) represents a probability of a state $s_t$ at time t being the state $S_i$ when a state $s_{t+1}$ at time t+1 is a state $S_j$ and an observed value $o_{t+1}$ is observed after a state transition is effected by performing (observing) an action $u_t$ in the state $S_i$ at time t in a case of being in the state $S_j$ at time t+1, and thereafter observing the action series $u_{t+1}, u_{t+2}, \ldots, u_{T-1}$ of the learning data and observing the observed value series $o_{t+2}, O_{t+3}, \ldots, O_T$.

In addition, the initial value $\beta_T(i)$ of the backward probability $\beta_t(i)$ is expressed by equation (4).

$$\beta_T(i) = 1 \quad (4)$$

The initial value $\beta_T(i)$ of equation (4) indicates that a probability of being in the state $S_i$ at the end (time t=T) is 1.0, that is, that the agent is inevitably in the state $S_i$ at the end.

The extended HMM is different from the ordinary HMM in using the state transition probability $a_{ij}(u_t)$ for each action as state transition probability of a state transition from a certain state $S_i$ to a certain state $S_j$, as indicated in equation (1) and equation (3).

After, in step S32, the forward probability $\alpha_{t+1}(j)$ and the backward probability $\beta_t(i)$ are calculated, the process proceeds to step S33, where the learning part 21 re-estimates the initial state probability $\pi_i$, the state transition probability $a_{ij}(U_m)$ for each action $U_m$, and the observation probability $b_i(O_k)$ as model parameters $\Lambda$ of the extended HMM using the forward probability $\alpha_{t+1}(j)$ and the backward probability $\beta_t(i)$.

Herein, the re-estimation of the model parameters are performed as follows by extending the Baum-Welch re-estimation method as state transition probability is extended to the state transition probability $a_{ij}(U_m)$ for each action $U_m$.

Namely, a probability $\zeta_{t+1}(i, j, U_m)$ of a state transition being made to a state $S_j$ at time t+1 by performing an action $U_m$ in a state $S_i$ at time t in a case where an action series $U=u_1, u_2, \ldots, u_{T-1}$ and an observed value series $O=o_1, o_2, \ldots, o_T$ are observed in the model $\Lambda$ as the present extended HMM is expressed by equation (5) using forward probability $\alpha_t(i)$ and backward probability $\beta_{t+1}(j)$.

$$\xi_{t+1}(i, j, U_m) = P(s_t = i, s_{t+1} = j, u_t = U_m | O, U, \Lambda) \quad (5)$$
$$= \frac{\alpha_t(i) a_{ij}(U_m) b_j(o_{t+1}) \beta_{t+1}(j)}{P(O, U | \Lambda)} \quad (1 \le t \le T-1)$$

Furthermore, a probability $\gamma_t(i, U_m)$ of action $u_t=U_m$ being performed in the state $S_i$ at time t can be calculated as a probability obtained by marginalizing the probability $\zeta_{t+1}(i, j, U_m)$ with respect to the state $S_j$ at time t+1. And it is expressed by equation (6).

$$\gamma_t(i, U_m) = P(s_t = i, u_t = U_m | O, U, \Lambda) \quad (6)$$
$$= \sum_{j=1}^{N} \xi_{t+1}(i, j, U_m) \quad (1 \le t \le T-1)$$

The learning part 21 re-estimates the model parameters $\Lambda$ of the extended HMM using the probability $\zeta_{t+1}(i, j, U_m)$ of equation (5) and the probability $\gamma_t(i, U_m)$ of equation (6).

Herein, supposing that estimated values obtained by re-estimating the model parameters $\Lambda$ are represented as model parameters $\Lambda'$ using a prime ('), the estimated value $\pi'_i$ of initial state probability, which is a model parameter $\Lambda'$, is obtained according to equation (7).

$$\pi'_i = \frac{\alpha_1(i) \beta_1(i)}{P(O, U | \Lambda)} \quad (1 \le i \le N) \quad (7)$$

Moreover, the estimated value $a'_{ij}(U_m)$ of state transition probability for each action, which estimated value is a model parameter $\Lambda'$, is obtained according to equation (8).

$$a'_{ij}(U_m) = \frac{\sum_{t=1}^{T-1} \xi_{t+1}(i, j, U_m)}{\sum_{t=1}^{T-1} \gamma_t(i, U_m)} = \frac{\sum_{t=1}^{T-1} \alpha_t(i) a_{ij}(U_m) b_j(o_{t+1}) \beta_{t+1}(j)}{\sum_{t=1}^{T-1} \sum_{j=1}^{N} \alpha_t(i) a_{ij}(U_m) b_j(o_{t+1}) \beta_{t+1}(j)} \quad (8)$$

Herein, the numerator of the estimated value $a'_{ij}(U_m)$ of state transition probability of equation (8) represents an expected value of the number of times of making a state transition to the state $S_j$ by performing the action $u_t=U_m$ in the state $S_i$, and the denominator of the estimated value $a'_{ij}(U_m)$ of state transition probability of equation (8) represents an expected value of the number of times of making a state transition by performing the action $u_t=U_m$ in the state $S_i$.

The estimated value $b'_j(O_k)$ of observation probability, which estimated value is a model parameter $\Lambda'$, is obtained according to equation (9).

$$b'_j(O_k) = \frac{\sum_{t=1}^{T-1} \sum_{i=1}^{N} \sum_{m=1}^{M} \xi_{t+1}(i, j, U_m, O_k)}{\sum_{t=1}^{T-1} \sum_{i=1}^{N} \sum_{m=1}^{M} \xi_{t+1}(i, j, U_m)} = \frac{\sum_{t=1}^{T-1} \alpha_{t+1}(j) b_j(O_k) \beta_{t+1}(j)}{\sum_{t=1}^{T-1} \alpha_{t+1}(j) \beta_{t+1}(j)} \quad (9)$$

The numerator of the estimated value $b'_j(O_k)$ of observation probability of equation (9) represents an expected value of the number of times of making a state transition to the state $S_j$ and observing an observed value $O_k$ in the state $S_j$, and the denominator of the estimated value $b'_j(O_k)$ of observation probability of equation (9) represents an expected value of the number of times of making a state transition to the state $S_j$.

After, in step S33, re-estimating the estimated values $\pi'_i$, $a'_{ij}(U_m)$, and $b'_j(O_k)$ of initial state probability state, transition probability, and observation probability as model parameters $\Lambda'$, the learning part 21 stores each of the estimated value $\pi'_i$ as new initial state probability $\pi_i$, the estimated value $a'_{ij}(U_m)$ as new state transition probability $a_{ij}(U_m)$, and the estimated value $b'_j(O_k)$ as new observation probability $b_j(O_k)$ in the model storage 22 in an overwriting manner. The process proceeds to step S34.

In step S34, whether the model parameters of the extended HMM, that is, the (new) initial state probability $\pi_i$, the (new) state transition probability $a_{ij}(U_m)$, and the (new) observation probability $b_j(O_k)$ stored in the model storage 22 have converged is decided.

When, in step S34, it is decided that the model parameters of the extended HMM have not converged yet, the process returns to step S32 to repeat the similar processing using new initial state probability $\pi_i$, new state transition probability $a_{ij}(U_m)$, and new observation probability $b_j(O_k)$ stored in the model storage 22.

When it is decided in step S34 that the model parameters of the extended HMM have converged, that is, when the model parameters of the extended HMM after the re-estimation in step S33 are hardly changed from the model parameters of the extended HMM before the re-estimation, or when the likelihood at which the learning data is observed is hardly changed in the extended, the processing of learning of the extended HMM is terminated.

As described above, by learning the extended HMM defined by the state transition probability $a_{ij}(U_m)$ for each action using the action series of actions performed by the agent and the observed value series of observed values observed in the agent when the agent has performed the actions, the structure of the action environment is obtained through the observed value series in the extended HMM, and relation between each observed value and an action performed when the observed value is observed (relation between actions performed by the agent and observed values observed when the actions have been performed (observed values observed after the actions)) is obtained.

As a result, as described later, an appropriate action can be determined as an action to be performed by the agent in the action environment in the recognition action mode by using the extended HMM after such learning.

In addition, since the observation probability $b_i(O_k)$ of the state $S_i$ of the extended HMM is a probability of each observed value $O_k$ observed in the state $S_i$, the state $S_i$ can correspond to (can be considered to correspond to) the position in the action environment (labyrinth in the embodiment) at which each observed value $O_k$ is observed in the observation probability $b_i(O_k)$ of the state $S_i$.

(Processing in Recognition Action Mode)

Figure 7:
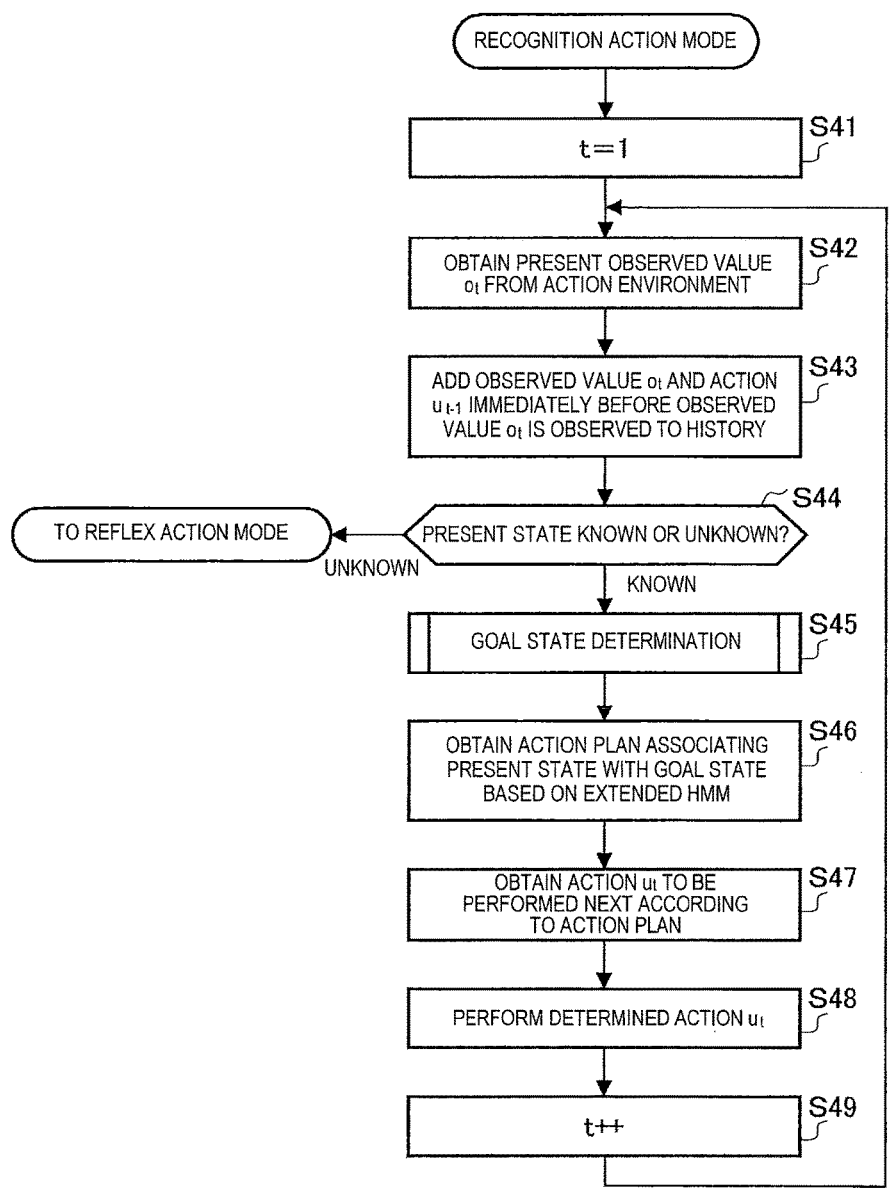
FIG. 7 is a flowchart for explaining processing in a recognition action mode.

FIG. 7 is a flowchart for explaining processing in the recognition action mode which is performed by the agent in FIG. 3.

In the recognition action mode, as described above, the agent determines a goal, recognizes present conditions, and calculates an action plan to achieve the goal from the present state. Furthermore, the agent determines an action to be performed next according to the action plan, and performs the action. Then, the agent repeats the above process.

Namely, in step S41, the state recognizing part 23 configures a variable t for counting time to 1, for example, as an initial value. Then, the process proceeds to step S42.

In step S42, the sensor 13 obtains a present observed value (observed value at time t) $o_t$ from the action environment to output. Then, the process proceeds to step S43.

In step S43, the history storage 14 stores the observed value $o_t$ at time t which is obtained by the sensor 13 and an action $u_{t-1}$ (action $u_{t-1}$ performed by the agent at immediately preceding time t−1) outputted by the sensor 13 when the observed value $o_t$ is observed (immediately before the sensor 13 obtains the observed value $o_t$) as a history of an observed value and an action in the form of being added to already stored series of observed values and actions. Then, the process proceeds to step S34.

In step S44, the state recognizing part 23 recognizes the states of the agent at the present time, that is, a present state as a state in the extended HMM at the present time, on the basis of the extended HMM using the action performed by the agent and the observed value observed in the agent when the action has been performed, and obtains a present state.

Namely, the state recognizing part 23 reads out, from the history storage 14, an action series of zero or more latest actions and an observed value series of one or more latest observed values as an action series and an observed value series for recognition which are used to recognize the present states of the agent.

Furthermore, the state recognizing part 23 observes the action series and the observed value series for recognition, and obtains an optimum state probability $\delta_t(j)$, which is a maximum value of a state probability of being in a state $S_j$ at time (present time) t, and an optimum path $\Psi_t(j)$, which is a state series providing the optimum state probability $\delta_t(j)$, according to a Viterbi algorithm (algorithm obtained by extending it to actions), for example, in the extended HMM (already learned extended HMM) stored in the model storage 22.

Herein, according to the Viterbi algorithm, a state series that maximizes the likelihood of a certain observed value series being observed (maximum likelihood state series) can be estimated among series of states (state series) traced when the observed value series is observed in the ordinary HMM.

However, because state transition probability is extended with respect to actions in the extended HMM, the Viterbi algorithm has to be extended with respect to actions in order to be applied to the extended HMM.

Thus, the state recognizing part 23 obtains the optimum state probability $\delta_t(j)$ and the optimum path $\Psi_t(j)$ according to equation (10) and equation (11), respectively.

$$\delta_t(j) = \max_{1 \leq i \leq N} [\delta_{t-1}(i) a_{ij}(u_{t-1}) b_{ij}(o_t)] \ (1 \leq t \leq T, 1 \leq j \leq N) \quad (10)$$

$$\psi_t(j) = \arg\max_{1 \leq i \leq N} [\delta_{t-1}(i) a_{ij}(u_{t-1}) b_{ij}(o_t)] \ (1 \leq t \leq T, 1 \leq j \leq N) \quad (11)$$

Herein, max[X] in equation (10) denotes a maximum value of X obtained when a suffix i representing a state $S_i$ is changed to integers in a range of 1 to N, which is the number of states. Moreover, argmax{X} in equation (11) denotes a suffix i that maximizes X obtained when the suffix i is changed to integers in a range of 1 to N.

The state recognizing part 23 observes the action series and the observed value series for recognition, and obtains the maximum likelihood state series, which is a state series reaching a state $S_j$ and maximizing the optimum state probability $\delta_t(j)$ of equation (10) at time t from the optimum path $\Psi_t(j)$ of equation (11).

Furthermore, the state recognizing part 23 obtains (recognizes) the last state of the maximum likelihood state series as a present state $s_t$.

The state recognizing part 23 obtains the present state $s_t$ and further, in step S44, decides whether the present state $s_t$ is a state that has been already known (known state) or a state that has not been known yet (unknown state).

Herein, an observed value series for recognition (or an observed value series and an action series for recognition) is represented by O, and a maximum likelihood state series in which the observed value series O and the action series for recognition is observed is represented by X. In addition, the number of states constituting the maximum likelihood state series X is equal to a series length q of the observed value series O for recognition.

Moreover, it is supposed that time t at which the first observed value of the observed value series O for recognition is observed is 1, for example, that a state of the maximum likelihood state series X at time t (tth state from the top) is represented by $X_t$, and that state transition probability of a state transition from a state $X_t$ at time t to a state $X_{t+1}$ at time t+1 is represented by $A(X_t, X_{t+1})$.

Furthermore, it is supposed that likelihood of an observed value series O for recognition being observed in the maximum likelihood state series X is represented by P(O|X).

In step S44, the state recognizing part 23 decides, when deciding whether the present state $s_t$ is a known state or unknown state, whether or not an equation $A(X_t, X_{t+1}) > \text{Thres}_{trans}$ (where t=1, 2, . . . , q−1) and an equation $P(O|X) > \text{Thres}_{obs}$ are satisfied, for example.

Herein, the threshold value $\text{Thres}_{trans}$ in the equation $A(X_t, X_{t+1}) > \text{Thres}_{trans}$ is a threshold value for distinguishing whether or not there can be a state transition from a state $X_t$ to a state $X_{t+1}$.

Moreover, the threshold value $\text{Thres}_{obs}$ in the equation $P(O|X) > \text{Thres}_{obs}$ is a threshold value for distinguishing whether an observed value series O for recognition can be observed in the maximum likelihood state series X.

The threshold values $\text{Thres}_{trans}$ and $\text{Thres}_{obs}$ are configured to values for which the above-mentioned distinction can be appropriately performed, using simulation or the like, for example.

When at least one of the equation $A(X_t,X_{t+1})>Thres_{trans}$ and the equation $P(O|X)>Thres_{obs}$ is not satisfied, the state recognizing part 23 decides, in step S44, that the present state of the agent is the unknown state.

Moreover, when both of the equation $A(X_t,X_{t+1})>Thres_{trans}$ and the equation $P(O|X)>Thres_{obs}$ are satisfied, the state recognizing part 23 decides, in step S44, that the present state of the agent is the known state.

Herein, as mentioned above, the state $S_i$ in the extended HMM can correspond to (can be considered to correspond to) the position in the action environment (labyrinth in the embodiment) at which each observed value $O_k$ is observed in observation probability $b_i(O_k)$ of the state $S_i$.

In the extended HMM, when the structure in the vicinity of the position in the action environment corresponding to the state $S_i$ is obtained to some extent, the state $S_i$ is the known state. When it is not, the state $S_i$ is the unknown state.

Accordingly, when the learning of the extended HMM is performed (sufficiently) to some extent using the observed value series and the action series observed in the vicinity of the position in the action environment corresponding to the state $S_i$, the state $S_i$ is the known state. On the other hand, when the learning of the extended HMM is not performed at all (almost) using the observed value series and the action series observed in the vicinity of the position in the action environment corresponding to the state $S_i$, the state $S_i$ is the unknown state.

In step S44, when it is decided that the present state is the unknown state, the agent terminates the processing in the recognition action mode and initiates the processing in the reflex action mode (FIG. 4) for learning the vicinity of the position in the action environment corresponding to the unknown state (or the extended HMM using the observed values observed in the vicinity).

Moreover, in step S44, when it is decided that the present state is the known state, the state recognizing part 23 supplies the present state to the action determining part 24. The process proceeds to step S45.

In step S45, the goal determining section 16 performs goal state determination processing of determining a goal state from among the states of the extended HMM, and supplies the goal state determined in the goal state determination processing to the action determining part 24. The process proceeds to step S46.

In step S46, the action determining part 24 calculates an action plan as a series of actions that maximizes the likelihood of state transition from the present state from the state recognizing part 23 to the goal state from the goal determining section 16 according to the Viterbi algorithm (algorithm obtained by extending it to actions), for example, on the basis of the extended HMM stored in the model storage 22.

Herein, according to the Viterbi algorithm, a maximum likelihood state series that maximizes the likelihood of a certain observed value series being observed can be estimated among state series from one of two states to the other state, that is, state series from the present state to the goal state, for example, in the ordinary HMM.

However, as described above, because state transition probability is extended with respect to actions in the extended HMM, the Viterbi algorithm has to be extended with respect to actions in order to be applied to the extended HMM.

Thus, the action determining part 24 obtains a state probability $\delta_t(j)$ according to equation (12).

$$\delta'_t(j) = \max_{1\leq i\leq N, 1\leq m\leq M}[\delta'_{t-1}(i)a_{ij}(U_m)] \quad (12)$$

Herein, max[X] in equation (12) denotes a maximum value of X obtained when a suffix i representing a state $S_i$ is changed to integers in a range of 1 to N, which is the number of states, and a suffix m representing an action $U_m$ is changed to integers in a range of 1 to M, which is the number of actions.

Equation (12) is obtained by deleting the observation probability $b_j(o_t)$ from equation (10) for obtaining the optimum state probability $\delta_t(j)$. Moreover, in equation (12), the state probability $\delta'_t(j)$ is obtained in consideration of the action $U_m$. This corresponds to the extension of the Viterbi algorithm with respect to actions.

The action determining part 24 performs the calculation of equation (12) in a forward direction, and temporarily stores the suffix i taking a maximum state probability $\delta'_t(j)$ and the suffix m indicating an action $U_m$ performed when a state transition to the state $S_i$ indicated by the suffix i occurs at each time.

The action determining part 24 calculates the state probability $\delta'_t(j)$ of equation (12) with the present state $s_t$ as the first state, and terminates the calculation of the state probability $\delta'_t(j)$ of equation (12) when the state probability $\delta'_t(S_{goal})$ of a goal state $S_{goal}$ becomes a predetermined threshold value $\delta'_{th}$ or more, as indicated in equation (13).

$$\delta'_t(S_{goal}) \geq \delta'_{th} \quad (13)$$

In addition, the threshold value $\delta'_{th}$ in equation (13) is configured according to equation (14), for example.

$$\delta'_{th}=0.9^{T'} \quad (14)$$

Herein, T' in equation (14) denotes the number of times of calculations of equation (12) (series length of a maximum likelihood state series obtained from equation (12)).

According to equation (14), the threshold value $\delta'_{th}$ is configured by adopting 0.9 as a state probability when one likely state transition occurs.

Hence, according to equation (13), the calculation of the state probability $\delta'_t(j)$ of equation (12) is terminated when likely state transitions occur consecutively.

After terminating the calculation of the state probability $\delta'_t(j)$ of equation (12), the action determining part 24 obtains a maximum likelihood state series (shortest path in many cases) from the present state $s_t$ to the goal state $S_{goal}$ and a series of actions $U_m$ performed when a state transition providing the maximum likelihood state series occurs, by tracing the suffixes i and m stored for the state $S_i$ and the action $U_m$ from a state at the time of the termination, that is, the goal state $S_{goal}$ to the present state $s_t$ in an opposite direction.

Namely, as described above, the action determining part 24 stores the suffix i taking a maximum state probability $\delta'_t(j)$ and the suffix m representing an action $U_m$ performed when a state transition to the state $S_i$ indicated by the suffix i occurs at each time when calculating the state probability $\delta'_t(j)$ of equation (12) in a forward direction.

The suffix i at each time indicates which state $S_i$ has a maximum state probability when a return is made from a state $S_i$ to the state $S_i$ in a temporally retrograde direction. The suffix m at each time indicates an action $U_m$ that effects a state transition providing the maximum state probability.

Accordingly, when the suffixes i and m at each time are retraced time by time from the time of terminating the calculation of the state probability $\delta'_t(j)$ of equation (12), and a time of initiating the calculation of the state probability $\delta'_t(j)$ of equation (12) is reached, series formed by arranging each of a series of suffixes of states of a state series from the present state $s_t$ to the goal state $S_{goal}$ and a series of suffixes of actions of an action series performed when state transitions of the state series occur in temporally retrograde order are capable of being obtained.

The action determining part 24 obtains the state series (maximum likelihood state series) from the present state $s_t$ to the goal state $S_{goal}$ and the action series performed when the state transitions of the state series occur by rearranging the series arranged in temporally retrograde order in order of time.

The action series performed when the state transitions of the maximum likelihood state series from the present state $s_t$ to the goal state $S_{goal}$ occur, the action series being obtained by the action determining part 24 as described above, is an action plan.

Herein, the maximum likelihood state series obtained by the action determining part 24 together with the action plan is the state series of state transitions that occur (should occur) when the agent performs actions according to the action plan. Accordingly, when state transitions not in accordance with the arrangement of states as the maximum likelihood state series occur when the agent performs the actions according to the action plan, the agent may not reach the goal state even when the agent performs the actions according to the action plan.

After, in step S46, the action determining part 24 obtains the action plan as described above, the process proceeds to step S47, where the action determining part 24 determines an action $u_t$ to be performed next according to the action plan. Then, the process proceeds to step S40.

Namely, the action determining part 24 sets the first action of the action series as the action plan as the determined action $u_t$ to be performed next.

In step S48, the action determining part 24 controls the actuator 12 according to the action (determined action) $u_t$ determined in the immediately preceding step S47, and thereby, the agent performs the action $u_t$.

Thereafter, the process proceeds from step S48 to step S49, where the state recognizing part 23 increments time t by one. The process returns to step S32 to repeat the similar processing from step S42.

As described above, the state recognizing part 23 recognizes the present states of the agent using an action performed by the agent and an observed value observed in the agent when the action has been performed on the basis of the extended HMM. The goal determining section 16 determines a goal state. The action determining part 24 calculates an action plan, which is a series of actions that maximizes the likelihood (state probability) of state transition from the present state to the goal state on the basis of the extended HMM, and determines an action to be performed next by the agent according to the action plan. Therefore an appropriate action can be determined as an action to be performed by the agent for the agent to reach the goal state.

In addition, in the recognition action mode, when the present state is the known state, the actions from the present state to the goal state are performed as described above. Whereas, when the present state is the unknown state, as described regarding step S44, the agent terminates the recognition action mode and initiate the processing in the reflex action mode (FIG. 4) for learning the vicinity of the position in the action environment corresponding to the unknown state (or the extended HMM using the observed values observed in the vicinity).

Herein, as described regarding FIG. 3, a state transition probability model stored in the model storage 22 can employ an ordinary HMM as well as the extended HMM.

However, when the state transition probability model employs the ordinary HMM, the learning should be performed by individually preparing an HMM learning the observed value series and a controller of actions, which is a function and the like outputting the actions for realizing the state transitions of the HMM.

On the other hand, as to the extended HMM, the learning is performed for the observed value series and the action series in association with each other in the extended HMM. Therefore, the learning can be performed with small amounts of calculation cost and storage resources.

Moreover, when the state transition probability model employs the ordinary HMM, the state series up to the goal state is calculated using the HMM, whereas the actions for obtaining the state series should be calculated using the controller of actions.

On the other hand, as to the extended HMM, the maximum likelihood state series from the present state to the goal state and the action series for obtaining the maximum likelihood state series can be simultaneously obtained. Therefore, the action to be performed next by the agent can be determined with a small amount of calculation cost.

(Determination of Goal State)

Figure 8:
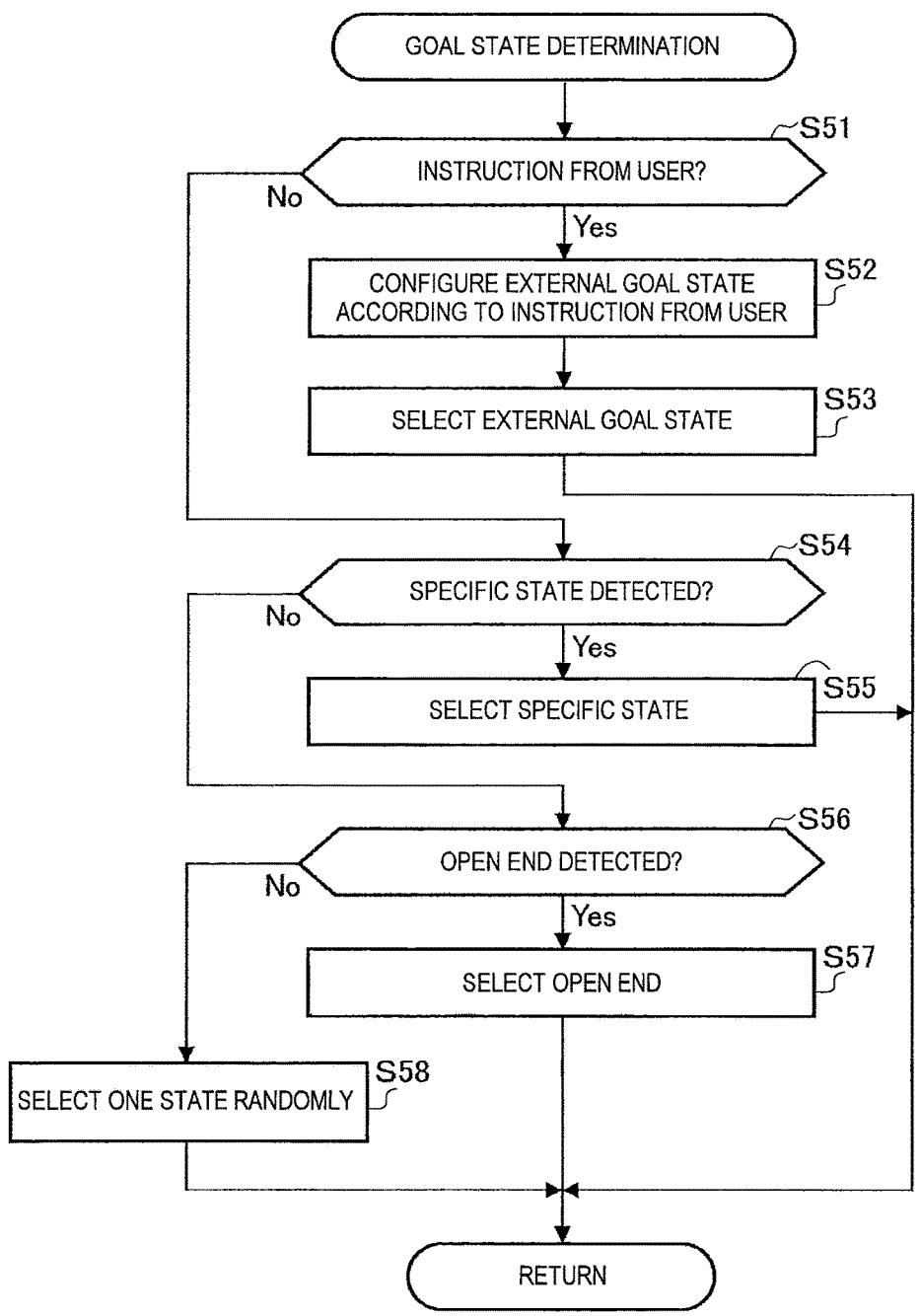
FIG. 8 is a flowchart for explaining processing of determining a goal state performed by a goal determining section 16.

FIG. 8 is a flowchart for explaining goal state determination processing performed by the goal determining section 16 of FIG. 3 in step S45 of FIG. 7.

In step S51, the external goal configuring part 33 in the goal determining section 16 decides whether there is an instruction from the user.

When, in step S51, it is decided that there is the instruction from the user, that is, that the user instructs designation of a predetermined position in the action environment, for example, and that instruction information representing the instruction is supplied from the user instruction output section 10 to the external goal configuring part 33, the process proceeds to step S52. The external goal configuring part 33 configures a state of the extended HMM corresponding to the position in the action environment instructed based on the instruction information, for example, as an external goal according to the instruction information from the user instruction output section 10 to supply to the goal selecting part 31. The process proceeds to step S53.

In step S53, the goal selecting part 31 preferentially selects the external goal from the external goal configuring part 33 as a goal state to supply to the action determining part 24. The process is returned.

On the other hand, when, in step S51, there is no instruction from the user, the process proceeds to step S54, where the specific state detecting part 36 decides whether a specific state (state set so) can be detected from among the states of the extended HMM stored in the model storage 22.

When, in step S54, it is decided that the specific state can be detected, the specific state detecting part 36 supplies the specific state as an internal goal to the goal selecting part 31. The process proceeds to step S55.

In step S55, the goal selecting part 31 selects the specific state from the specific state detecting part 36 as a goal state to supply to the action determining part 24. The process is returned.

When, in step S54, it is decided that the specific state is not detected, the process proceeds to step S56, where the open end detecting part 37 decides whether an open end can be detected from among the states of the extended HMM stored in the model storage 22.

When, in step S56, it is decided that the open end can be detected, the open end detecting part 37 supplies the open end as an internal goal to the goal selecting part 31. The process proceeds to step S57.

In step S57, the goal selecting part 31 selects the state of the extended HMM that is the open end from the specific state detecting part 36 as a goal state to supply to the action determining part 24. The process is returned.

Moreover, when, in step S56, it is decided that the open end is not detected, the process proceeds to step S58, where the goal selecting part 31 selects a state that the random goal generating part 35 randomly selects from the extended HMM stored in the model storage 22 (random goal) as a goal state to supply to the action determining part 24. The process is returned.

Namely, the random goal generating part 35 has already selected one state of the extended HMM randomly, and in step S58, the state thus randomly selected is selected as a goal state.

In addition, the random selection of the state by the random goal generating part 35, the detection of the specific state by the specific state detecting part 36, and the detection of the open end by the open end detecting part 37 can be performed according to an instruction from the outside such as an application providing the action environment in which the agent performs the actions and a user, for example.

Furthermore, the specific state detected by the specific state detecting part 36 can employ an arbitrary state of the extended HMM. Which state of the extended HMM is the specific state can be instructed from the outside such as the application or the user, for example.

(Detection of Open End)

Figure 9:
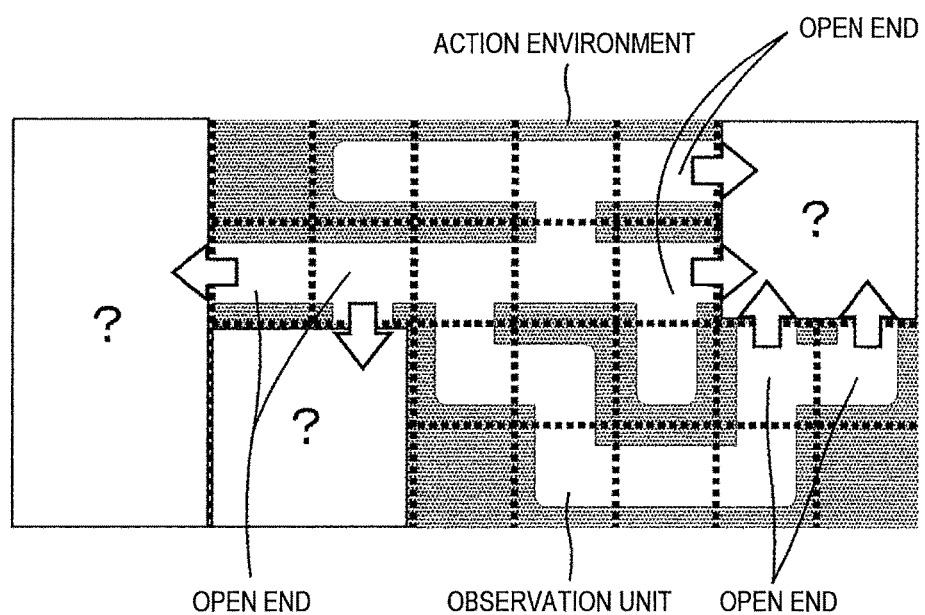
FIG. 9 a diagram for explaining states of the extended HMM as open ends detected by an open end detecting part 37.

FIG. 9 is a diagram for explaining states of the extended HMM as open ends detected by the open end detecting part 37 in FIG. 3.

An open end is broadly a state as a transition source from which a state transition unexperienced by the agent is known in advance possibly to occur in the extended HMM.

Specifically, a state that is not assigned state transition probability (being 0.0 (a value assumed to be 0.0)) and from which a state transition is difficult to be made because even though a comparison between the state transition probability of the state and the state transition probability of another state assigned an observation probability of the same observed value as in the state being observed (not being 0.0 (not a value assumed to be 0.0)) shows that the state transition can be made to a next state when a certain action is performed, the action has not been performed in the state corresponds to an open end.

Accordingly, when another state that has a state transition not yet performed among state transitions that can be made with a state in which a predetermined observed value is observed as a transition source in the extended HMM and in which the same observed value as the predetermined observed value is observed is detected, the other state is an open end.

As illustrated in FIG. 9, an open end is conceptually for example a state corresponding to an end part of a structure obtained by the extended HMM by placing the agent in a room and performing learning with a certain area in the room as an object (end part of the learned area in the room) or an entrance to a new room which entrance appears as a result of learning being performed with the whole area of a room in which the agent is placed as an object and thereafter the new room to which the agent can move being added next to the room.

An open end detected indicates beyond which part of the structure obtained by the extended HMM an area unknown to the agent extends. Accordingly, by calculating an action plan with an open end as a goal state, the agent aggressively performs an action of stepping into an unknown area. As a result, the agent can more widely learn the structure of the action environment (obtain an observed value series and an action series serving as learning data for learning the structure of the action environment), and efficiently gain experience necessary to supplement an obscure part whose structure is not obtained in the extended HMM (structure near an observation unit corresponding to a state as an open end in the action environment).

The open end detecting part 37 first generates an action template in order to detect an open end.

In generating the action template, the open end detecting part 37 subjects the observation probability $B=\{b_i(O_k)\}$ of the extended HMM to threshold processing, and makes a list for each observed value $O_k$ of states $S_i$ in which the observed value $O_k$ is observed with a probability equal to or higher than a threshold value.

FIGS. 10A and 10B are diagrams for explaining processing of listing states $S_i$ in which an observed value $O_k$ is observed with a probability equal to or higher than a threshold value.

FIG. 10A illustrates an example of the observation probability B of the extended HMM.

Namely, FIG. 10A illustrates an example of the observation probability B of the extended HMM where the number N of states $S_i$ is five and the number M of observed values $O_k$ is three.

The open end detecting part 37 sets the threshold value at 0.5, for example, and performs threshold processing that detects observation probabilities B equal to or higher than the threshold value.

In this case, in FIG. 10A, the threshold processing detects an observation probability $b_1(O_3)=0.7$ of an observed value $O_3$ being observed with respect to a state $S_1$, an observation probability $b_2(O_2)=0.8$ of an observed value $O_2$ being observed with respect to a state $S_2$, an observation probability $b_3(O_3)=0.8$ of the observed value $O_3$ being observed with respect to a state $S_3$, an observation probability $b_4(O_2)=0.7$ of the observed value $O_2$ being observed with respect to a state $S_4$, and an observation probability $b_5(O_1)=0.9$ of an observed value $O_1$ being observed with respect to a state $S_5$.

Thereafter, for each of the observed values $O_1$, $O_2$, and $O_3$, the open end detecting part 37 lists and detects states $S_i$ in which the observed value $O_k$ is observed with a probability equal to or higher than the threshold value.

FIG. 10B illustrates states $S_i$ listed for each of the observed values $O_1$, $O_2$, and $O_3$.

For the observed value $O_1$, the state $S_5$ is listed as a state in which the observed value $O_1$ is observed with a probability equal to or higher than the threshold value. For the observed value $O_2$, the states $S_2$ and $S_4$ are listed as states in which the observed value $O_2$ is observed with a probability equal to or higher than the threshold value. For the observed value $O_3$, the states $S_1$ and $S_3$ are listed as states in which the observed value $O_3$ is observed with a probability equal to or higher than the threshold value.

Thereafter, the open end detecting part 37 calculates, with respect to each observed value $O_k$, a transition probability corresponding value as a value corresponding to the state transition probability $a_{ij}(U_m)$ of a state transition whose state transition probability $a_{ij}(U_m)$ is a maximum value, for each action $U_m$ using the state transition probability $A=\{a_{ij}(U_m)\}$ of the extended HMM, among state transitions from a state $S_i$ listed for the observed value $O_k$. And it sets the transition probability corresponding value calculated for each action $U_m$ with respect to each observed value $O_k$ as an action probability of the action $U_m$ being performed when the observed value $O_k$ is observed to generate an action template C, which is a matrix having the action probability as an element.

Figure 11:
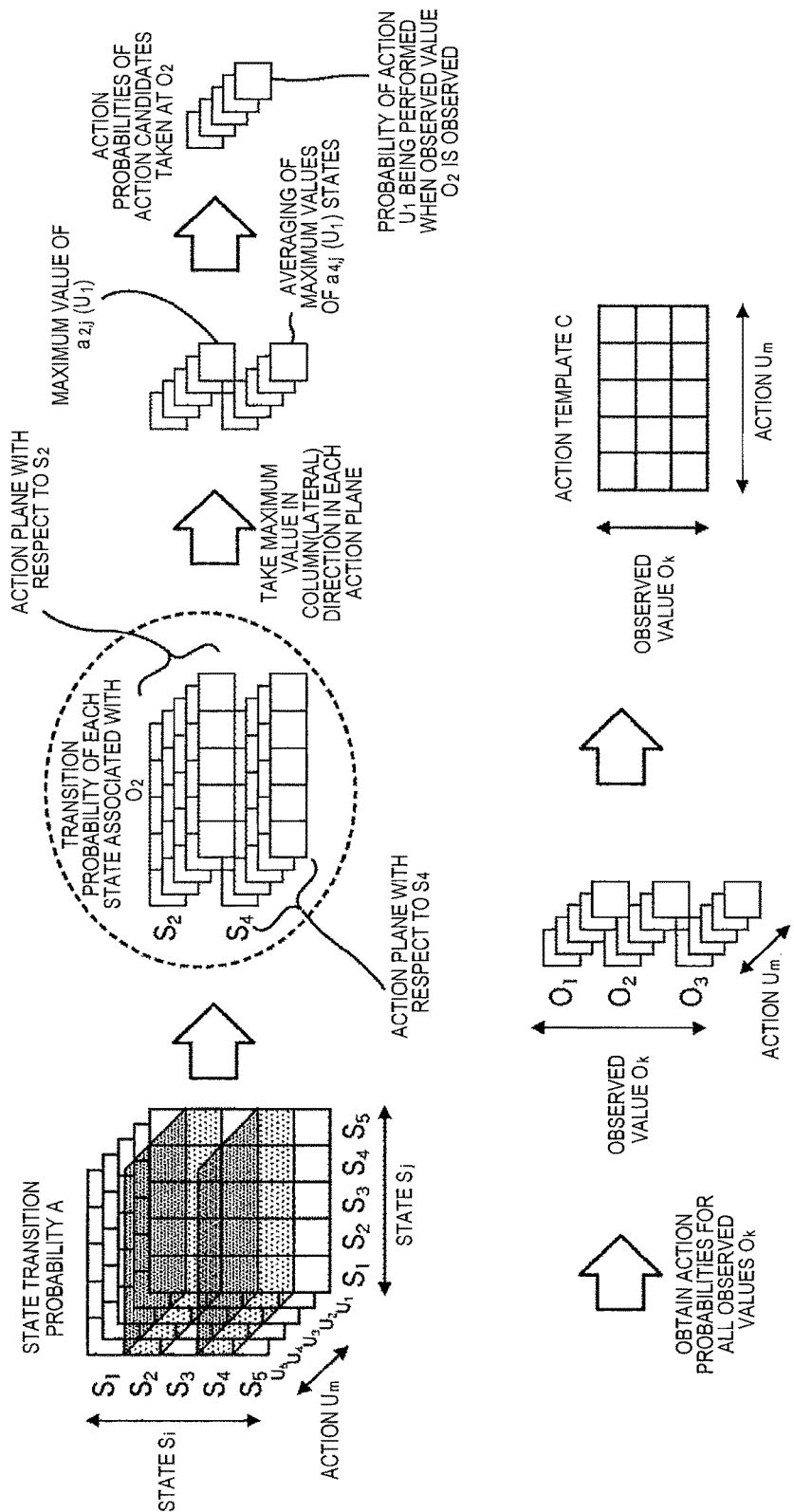
FIG. 11 is a diagram for explaining a method of generating an action template C using states $S_i$ listed for observed values $O_k$.

Namely, FIG. 11 is a diagram for explaining a method of generating the action template C using states $S_i$ listed for observed values $O_k$.

The open end detecting part 37 detects a maximum state transition probability from state transition probabilities which are arranged in a column (lateral) direction (j-axis direction) and are of state transitions from a state $S_i$ listed for an observed value $O_k$ in the three-dimensional state transition probability table.

Namely, for example, attention will now be directed to the observed value $O_2$, and suppose that the states $S_2$ and $S_4$ are listed for the observed value $O_2$.

In this case, the open end detecting part 37 directs attention to an action plane which is obtained by cutting the three-dimensional state transition probability table by a plane perpendicular to the i-axis at a position i=2 on the i-axis and is with respect to the state $S_2$, and detects a maximum value of state transition probabilities $a_{2,j}(U_1)$ of state transitions from the state $S_2$ which occur when the action $U_1$ is performed in the action plane with respect to the state $S_2$.

Namely, the open end detecting part 37 detects a maximum value of the state transition probabilities $a_{2,1}(U_1)$, $a_{2,2}(U_1)$, ..., $a_{2,1}(U_1)$ arranged in the j-axis direction at a position m=1 on the action axis in the action plane with respect to the state $S_2$.

Similarly, the open end detecting part 37 detects maximum values of the state transition probabilities of state transitions from the state $S_2$ which occur when the other actions $U_m$ are performed from the action plane with respect to the state $S_2$.

Furthermore, with respect to the state $S_4$ as another state listed for the observed value $O_2$, the open end detecting part 37 similarly detects a maximum value of the state transition probabilities of state transitions from the state $S_4$ which occur when each action $U_m$ is performed from the action plane with respect to the state $S_4$.

As described above, the open end detecting part 37 detects a maximum value of the state transition probabilities of the state transitions that occur when each action $U_m$ is performed with respect to each of the states $S_2$ and $S_4$ listed for the observed value $O_2$.

Thereafter, the open end detecting part 37 averages the maximum values of the state transition probabilities which are detected as described above with respect to the states $S_2$ and $S_4$ listed for the observed value $O_2$ for each action $U_m$, and sets the average value obtained by the averaging as a transition probability corresponding value corresponding to a maximum value of state transition probability with respect to the observed value $O_2$.

The transition probability corresponding value with respect to the observed value $O_2$ is obtained for each action $U_m$. The transition probability corresponding value for each action $U_m$ which is obtained with respect to the observed value $O_2$ indicates a probability of the action $U_m$ being performed (action probability) when the observed value $O_2$ is observed.

The open end detecting part 37 similarly obtains a transition probability corresponding value as an action probability for each action $U_m$ with respect to the other observed values $O_k$.

Then, the open end detecting part 37 generates a matrix having an action probability of the action $U_m$ being performed when the observed value $O_k$ is observed as an element in a kth row from the top and an mth column from the left as an action template C.

Accordingly, the action template C is a matrix of K rows and M columns in which the number of rows is equal to the number of observed values $O_k$ and the number of columns is equal to the number of actions $U_m$.

After generating the action template C, the open end detecting part 37 calculates an action probability D based on observation probability using the action template C.

Figure 12:
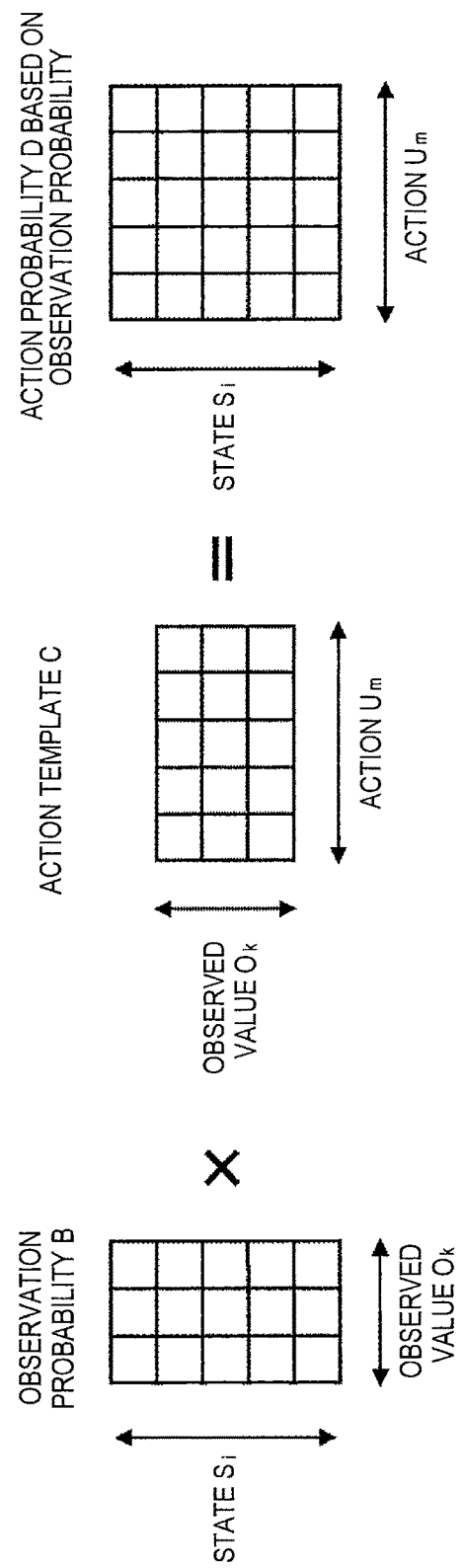
FIG. 12 is a diagram for explaining a method of calculating an action probability D based on observation probability.

FIG. 12 is a diagram of assistance in explaining a method of calculating the action probability D based on the observation probability.

Now supposing that a matrix having the observation probability $b_i(O_k)$ of an observed value $O_k$ being observed in a state $S_i$ as an element in an ith row and a kth column is referred to as an observation probability matrix B, the observation probability matrix B is a matrix of N rows and K columns in which the number of rows is equal to the number N of states $S_i$ and the number of columns is equal to the number K of observed values $O_k$.

The open end detecting part 37 calculates the action probability D based on the observation probability, which is a matrix having a probability of an action $U_m$ being performed in a state $S_i$ in which an observed value $O_k$ is observed as an element in an ith row and an mth column, by multiplying the observation probability matrix B of N rows and K columns by the action template C, which is a matrix of K rows and M columns, according to equation (15).

$$D=BC \qquad (15)$$

In addition to calculating the action probability D based on the observation probability as described above, the open end detecting part 37 calculates an action probability E based on state transition probability.

Figure 13:
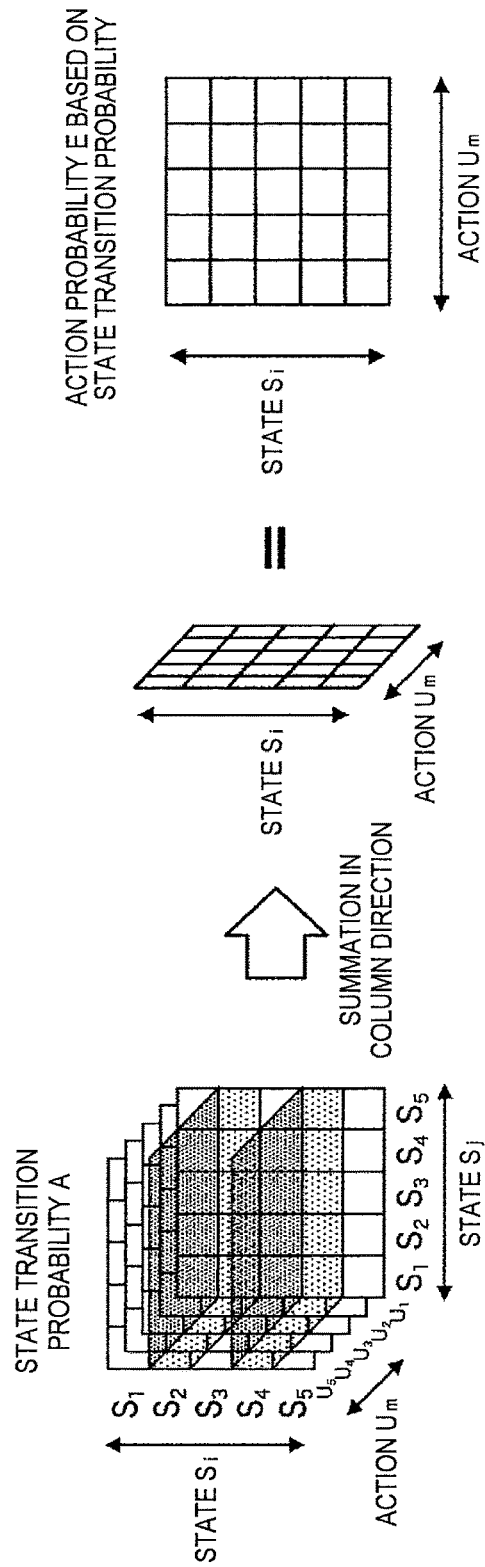
FIG. 13 is a diagram for explaining a method of calculating an action probability E based on state transition probability.

FIG. 13 is a diagram for explaining a method of calculating the action probability E based on the state transition probability.

The open end detecting part 37 calculates the action probability E based on the state transition probability which is a matrix having a probability of an action $U_m$ being performed in a state $S_i$ as an element in an ith row and an mth column, by adding together state transition probabilities $a_{ij}(U_m)$ for each action $U_m$ with respect to each state $S_i$ in an i-axis direction in a three-dimensional state transition probability table A made of an i-axis, a j-axis, and an action axis.

Namely, the open end detecting part 37 calculates the action probability E based on the state transition probability, which is a matrix of N rows and M columns, by obtaining a sum total of state transition probabilities $a_{ij}(U_m)$ arranged in a horizontal direction (column direction) in the state transition probability table A made of the i-axis, the j-axis, and the action axis, that is, a sum total of state transition probabilities $a_{ij}(U_m)$ arranged in a straight line parallel to the j-axis which passes through a point (i, m) when attention is directed to a position i on the i-axis and a position m on the action axis, and setting the sum total as an element in the ith row and mth column of the matrix.

After calculating the action probability D based on the observation probability and the action probability E based on the state transition probability as described above, the open end detecting part 37 calculates a differential action probability F, which is a difference between the action probability D based on the observation probability and the action probability E based on the state transition probability, according to equation (16).

$$F = D - E \quad (16)$$

The differential action probability F is a matrix of N rows and M columns as with the action probability D based on the observation probability and the action probability E based on the state transition probability.

Figure 14:
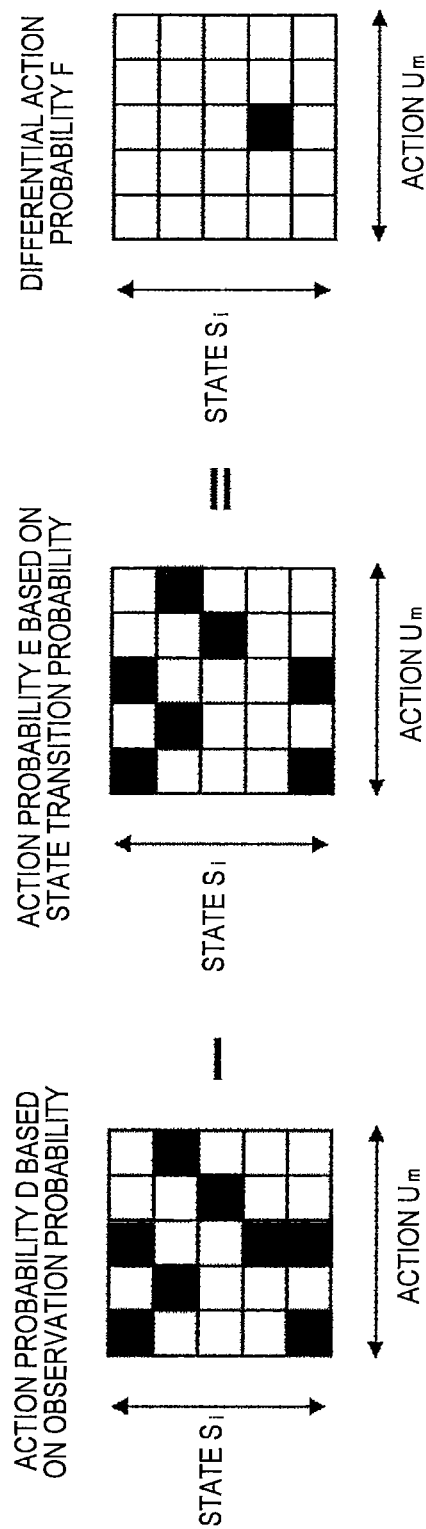
FIG. 14 is a diagram schematically illustrating a differential action probability F.

FIG. 14 is a diagram schematically illustrating the differential action probability F.

Small squares in FIG. 14 represent the elements of the matrix. Squares without a pattern represent elements whose value is 0.0 (a value assumed to be 0.0). Squares filled in with black represent elements whose value is not 0.0 (not a value assumed to be 0.0).

According to the differential action probability F, when there are a plurality of states as states in which an observed value $O_k$ is observed, and it is known that an action $U_m$ can be performed from a part of the plurality of states (a state in which the agent has performed the action $U_m$), another state in which a state transition that occurs when the action $U_m$ is performed is not reflected in a state transition probability $a_{ij}(U_m)$ (a state in which the agent has not performed the action $U_m$), that is, an open end can be detected.

Namely, when a state transition that occurs when an action $U_m$ is performed is reflected in the state transition probability $a_{ij}(U_m)$ of a state $S_i$, an element in the ith row and the mth column of the action probability D based on the observation probability and an element in the ith row and the mth column of the action probability E based on the state transition probability assume similar values to each other.

On the other hand, when a state transition that occurs when the action $U_m$ is performed is not reflected in the state transition probability $a_{ij}(U_m)$ of the state $S_i$, the element in the ith row and the mth column of the action probability D based on the observation probability is a certain value that hardly is assumed to be 0.0 due to an effect of the state transition probability of a state in which the same observed value as in the state $S_i$ is observed and the action $U_m$ has been performed, whereas the element in the ith row and the mth column of the action probability E based on the state transition probability is 0.0 (including a small value that can be assumed to be 0.0).

Accordingly, when a state transition that occurs when the action $U_m$ is performed is not reflected in the state transition probability $a_{ij}(U_m)$ of the state $S_i$, an element in the ith row and the mth column of the differential action probability F has a value (absolute value) that hardly is assumed to be 0.0. Therefore, an open end and an action that has not been performed in the open end can be detected by detecting an element having a value that hardly is assumed to be 0.0 in the differential action probability F.

Namely, when the element in the ith row and the mth column of the differential action probability F has a value that hardly is assumed to be 0.0, the open end detecting part 37 detects the state $S_i$ as an open end, and detects the action $U_m$ as an action that has not been performed in the state $S_i$ as an open end.

Figure 15:
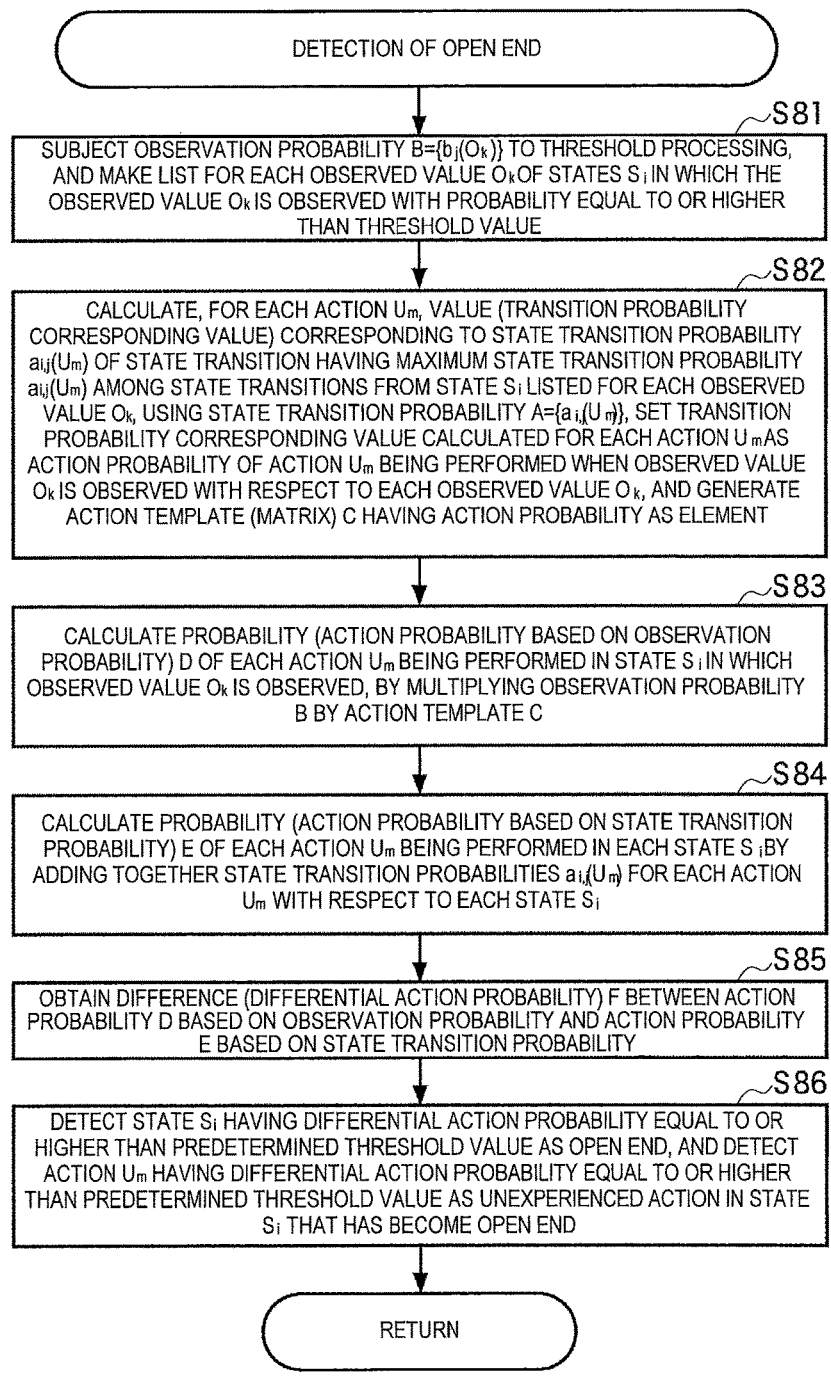
FIG. 15 is a flowchart for explaining processing of detecting an open end.

FIG. 15 is a flowchart for explaining the processing of detecting an open end performed by the open end detecting part 37 in FIG. 3.

In step S81, the open end detecting part 37 subjects the observation probability $B=\{b_i(O_k)\}$ of the extended HMM stored in the model storage 22 (FIG. 3) to threshold processing, and thereby makes a list for each observed value $O_k$ of states $S_i$ in which the observed value $O_k$ is observed with a probability equal to or higher than a threshold value, as described with reference to FIGS. 10A and 10B.

After step S81, the process proceeds to step S82, where, as described with reference to FIG. 11, the open end detecting part 37 calculates a transition probability corresponding value for each action $U_m$ with respect to each observed value $O_k$ using the state transition probability $A=\{a_{ij}(U_m)\}$ of the extended HMM stored in the model storage 22 as a value corresponding to the state transition probability $a_{ij}(U_m)$ of a state transition whose state transition probability $a_{ij}(U_m)$ is a maximum among state transitions from a state $S_i$ listed for the observed value $O_k$. And it sets the transition probability corresponding value calculated for each action $U_m$ with respect to each observed value $O_k$ as an action probability of the action $U_m$ being performed when the observed value $O_k$ is observed to generate an action template C, which is a matrix having the action probability as an element.

Thereafter, the process proceeds from step S82 to step S83, where the open end detecting part 37 calculates an action probability D based on observation probability by multiplying an observation probability matrix B by the action template C according to equation (15). Then, the process proceeds to step S84.

In step S84, as described with reference to FIG. 13, the open end detecting part 37 calculates an action probability E based on state transition probability, which is a matrix having a probability of an action $U_m$ being performed in a state $S_i$ as an element in an ith row and an mth column, by adding together state transition probabilities $a_{ij}(U_m)$ for each action $U_m$ with respect to each state $S_i$ in an i-axis direction in a state transition probability table A.

Then, the process proceeds from step S84 to step S85, where the open end detecting part 37 calculates a differential action probability F, which is a difference between the action probability D based on the observation probability and the action probability E based on the state transition probability according to equation (16). Then, the process proceeds to step S86.

In step S86, the open end detecting part 37 subjects the differential action probability F to threshold processing, and thereby detects an element whose value is equal to or higher than a threshold value in the differential action probability F as a detection object element as an object of detection.

Furthermore, the open end detecting part 37 detects the row i and the column m of the detection object element, detects a state $S_i$ as an open end, and detects an action $U_m$ as an unexperienced action that has not been performed in the open end $S_i$. Then, the process is returned.

By performing the unexperienced action in the open end, the agent can explore an unknown area continuing beyond the open end.

Herein, the existing action determining method determines the goal of the agent with a known area (learned area) and an unknown area (area not learned yet) treated equally (without distinction) without considering the experience of the agent. Thus, many actions has to be performed to accumulate experience of an unknown area. As a result, many trials and much time are necessary to learn the structure of the action environment widely.

On the other hand, the agent in FIG. 3 detects an open end, and determines an action with the open end as a goal state, and therefore, can therefore learn the structure of the action environment efficiently.

That is, an open end is a state beyond which an unknown area not experienced by the agent extends. Therefore, by detecting an open end and determining an action with the open end as a goal state, the agent can aggressively step into an unknown area. Thereby, the agent can efficiently accumulate experience to learn the structure of the action environment more widely.

As described above, the agent in FIG. 3 learns the extended HMM using the observed value observed when the action is performed, and meanwhile, determines the action performed by the agent on the basis of the innate rule or the extended HMM. Whereas, when there is the instruction from the user, the agent determines the action performed by the agent according to the instruction information representing the instruction. Therefore, the entertaining agent that can be a character for gaming not boring the user, for example, can be provided.

(One Embodiment of Game Machine)

Figure 16:
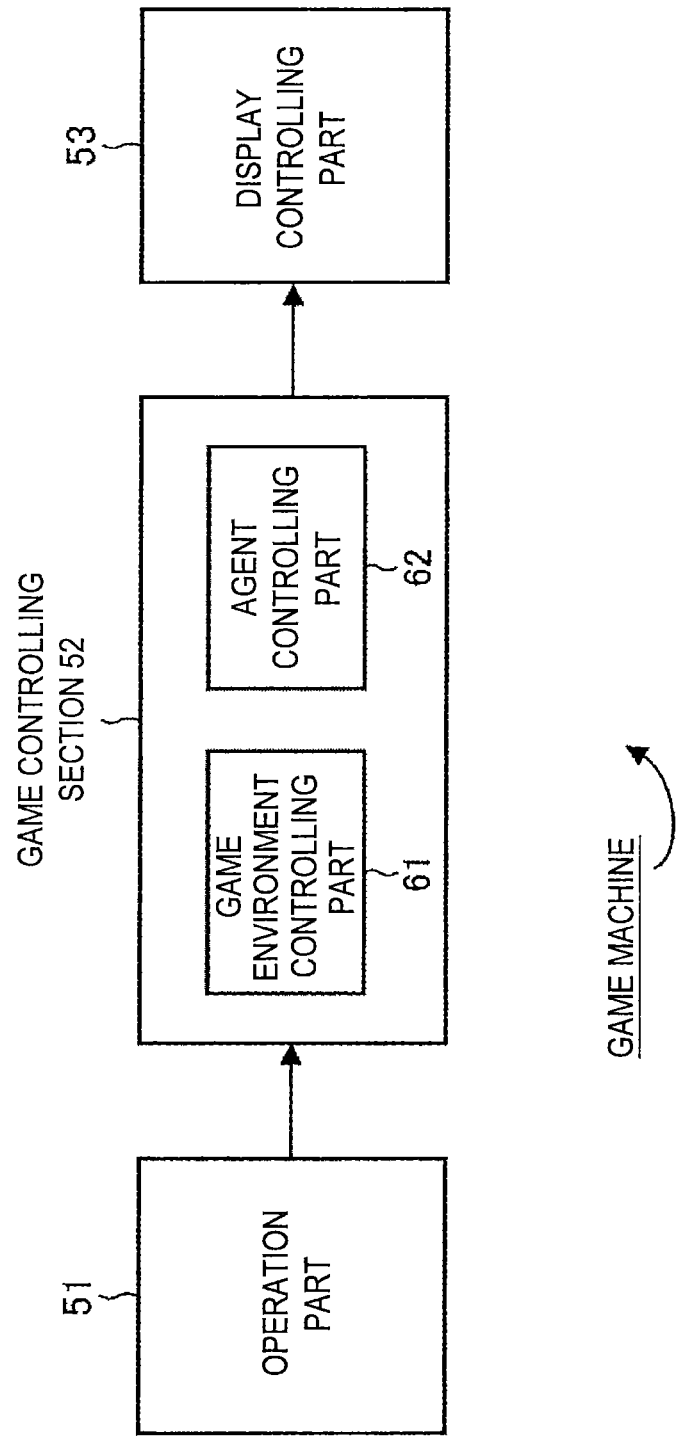
FIG. 16 is a block diagram illustrating an example of a configuration of one embodiment of a game machine to which the present technology is applied.

FIG. 16 is a block diagram illustrating an example of a configuration of one embodiment of a game machine to which the information processing apparatus according to the present technology is applied.

In the game machine in FIG. 16, a virtual agent constituted similarly to the agent in FIG. 3 is applied to a character of a game.

In FIG. 16, the game machine includes an operation part 51, a game controlling section 52 and a display controlling part 53.

The operation part 51 is operated by the user and supplies an operation signal corresponding to the operation of the user to the game controlling section 52.

The game controlling section 52 includes a game environment controlling part 61 and an agent controlling part 62, and controls the character of the game, an environment in which the character of the game appears (game environment) and the like according to the operation signal from the operation part 51 and the like.

Namely, the game environment controlling part 61 generates the game environment (image of it) according to the operation signal from the operation part 51 and the like.

The agent controlling part 62 generates the virtual agent constituted similarly to the agent in FIG. 3 (image of it, for example, an instance of the agent) as the character of the game according to the operation signal from the operation part 51.

The game controlling section 52 generates a screen of the game (image of it) to supply to the display controlling part 53 by overlapping the agent generated by the agent controlling part 62 with the game environment generated by the game environment controlling part 61 (image of it).

The display controlling part 53 displays the screen of the game from the game controlling section 52 on a display not shown.

Herein, the agent in FIG. 3 can, by autonomously moving in the action environment such as a labyrinth as described above and learning the extended HMM using the observed value observed from the movement, obtain the structure of the action environment (labyrinth) and move to the position in the labyrinth corresponding to the state selected as the goal state.

Moreover, when there is an instruction of the user, the agent moves according to the instruction of the user, as well as moving autonomously.

Accordingly, in the agent, the instruction of the user accelerates the learning of the extended HMM (obtaining of the structure of the action environment), and the extent of the acceleration, that is, the progress of the learning of the extended HMM varies depending on the quality of the instruction of the user. Thus, since the progress of the learning of the extended HMM by the agent varies depending on the quality of the instruction of the user, the agent shows entertaining properties such as the variation of an extent of growth (progress of the extended HMM) depending on a way of instruction by the user (quality of the instruction of the user).

By applying such an entertaining agent to the character of the game, a novel game in which the user can feel new kinds of sensation can be provided.

Namely, in the novel game, the agent is caused to perform learning for the game (learning in order to obtain knowledge, hereinafter also referred to as game learning), and the game using the agent after the learning is performed. In the game learning, the user can bring the agent various kinds of instructions, and the performance of the agent largely depends on the instructions brought by the user.

Furthermore, in the novel game, the user can play a match against the agent instructed, that is, grown by the user itself, or can play a match between the agent grown by the user itself and an agent grown by another user, for example.

Moreover, in the novel game, the user can make a team with the agent grown by the user itself and play a match against a team of another user and an agent grown by the other user, for example.

The user can change the performance of the agent by performing appropriate instructions in the game learning. Accordingly, the user can change the performance of the agent indirectly although it is difficult to change it directly by changing parameters, program or the like on the agent, for example. And, since the performance of the agent is not necessarily changed in the way the user wants according to the instructions of the user, the user can feel the sensation in which things are not going as the user wants.

In addition, a match between an agent grown by a user A and an agent grown by another user B can be played in one game machine in FIG. 16, and also can be played by connecting two game machines via a network.

Such a novel game in which the agent is applied to the character of the game can include a coin collecting game in which players collect, moving in a labyrinth in which items such as coins are placed, the coins and in which the player who has collected the most coins in total price is a winner, for example.

For example, a coin collecting game has a advance preparation period during which the agent or the user as a player performs advance preparation for collecting coins such as obtaining knowledge such as a structure of a labyrinth and places of the coins (coin positions) and a collecting period during which the coins placed in the labyrinth are collected using the knowledge obtained in the advance preparation. The player who has collected the most coins in total price during the collecting period is a winner.

The player begins collection of coins (movement to coin positions) after the advance preparation. At the beginning of the game, that is, at the beginning of the advance preparation in the coin collecting game, the structure of the labyrinth and the places of the coins are reset (newly configured) and the player is placed at an arbitrary position in the labyrinth.

Therefore, the agent as the player immediately after the beginning of the game is in the reflex action mode (FIG. 4), performs actions of moving in the labyrinth according to the innate rule, and performs the learning of the extended HMM (FIG. 6) using observed values observed in the actions (and actions). Thereby, the structure of the labyrinth is obtained, and a coin position (state of the extended HMM corresponding to it) is obtained from the observed values.

After, in the reflex action mode, the observed value (and the actions) are observed to some extent, and as a result, the structure of the labyrinth are obtained more or less by the learning using the observed values in the extended HMM, the mode in which the agent performs actions shifts from the reflex action mode to the recognition action mode (FIG. 7).

In the recognition action mode, selecting an open end as a goal state, for example, the agent performs actions of moving toward the open end, that is, an unknown region in the labyrinth as described with reference to FIG. 7 and FIG. 8.

Accordingly, by selecting the open end as the goal state, since the agent does not move to the already moved places repeatedly, the structure of the labyrinth and the coin positions can be obtained efficiently.

Moreover, in the recognition action mode, after setting a state of the extended HMM corresponding to the coin position in the labyrinth as a specific state and selecting the specific state as a goal state, the agent performs the actions of moving to the specific state, that is, the coin position as described with reference to FIG. 7 and FIG. 8.

Accordingly, by setting the state of the extended HMM corresponding to the coin position as the specific state and selecting the specific state as the goal state, the agent can move to the coin position and collect the coin at the coin position.

Furthermore, in the reflex action mode, and in the recognition action mode, when the user performs an instruction so as to designate a predetermined position in the labyrinth, the agent performs actions of moving toward the predetermined position according to the instruction information representing the instruction of the user as described with reference to FIG. 4, and FIG. 7 and FIG. 8, respectively.

Accordingly, for example, when the agent does not move to a coin position at which a coin at high price is placed in the advance preparation, the user who instructs about the coin position can cause the agent to obtain the coin position at which the coin at high price is placed (and the structure of the labyrinth from the present place to the coin position).

In a coin collecting game in which the agent is applied to the character of the game, the game can be conducted according to first to third rules as described below, for example.

Namely, in the first rule, the user (character which is operated by the user and imitates the user) plays a match against the agent (virtual agent constituted similarly to the agent in FIG. 3), and they compete with each other to collect more coins.

Herein, a processor (computer) as a substance of the agent is different from the user as a human in execution cycle and the agent (processor) is much faster than the user in execution cycle. Therefore, as to the agent, the execution cycle is adjusted so that the user can compete with the agent.

When the execution cycle of the agent is made too slow, the user can grasp the coin positions accurately by making notes of the coin positions or the like during the advance preparation, for example, and collect a number of the coins during the collection of the coins. Hence, the adjustment of the execution cycle is made not to cause such a situation.

For example, the agent adjusts the execution cycle for performing the action to 3 seconds and performs one action in the execution cycle of 3 seconds, meanwhile, when the user performs an operation of moving in the labyrinth within the execution cycle of 3 seconds, performs one action synchronizing the action. Thus, by the adjustment of the execution cycle, the user can compete with the agent and collect the coins.

In addition, when the user plays a match, a character which is operated by the user and imitates the user is displayed on the screen of the game, and the character imitating the user is generated by the game environment controlling part 61, for example.

In the second rule, the user grows the agent so as to obtain the coin positions and the structure of the labyrinth by instructing about the coin positions and the like in the advance preparation, and plays a match between the agent grown by the user and another agent grown by the user or another user. They compete with each other to collect more coins.

In the advance preparation, the user observes the agent, when it does not move to a coin position at which a coin at high price is placed or a position around which many coins are placed, guides the agent to such a coin position by instructing about the coin position, and causes it semi-forcibly to obtain the coin position at which the coin at high price is placed or the position around which many coins are placed.

Moreover, in the advance preparation, when there is a position to which the agent does not move in the labyrinth, the user guides the agent to such a position by instructing about the position, and causes the agent semi-forcibly to obtain the structure of the labyrinth around which it has not moved.

As described above, the agent can quickly obtain many coin positions and the structure in a wide range of the labyrinth by the instructions of the user, and can be grown as an agent with excellent performance.

Thus, the user can enjoy quality of growing (instruction) by the user itself by playing a match against the agent after the growing.

Moreover, the user can play a match between the agent grown by the user itself and an agent grown by another user.

In a match between an agent A grown by the user and an agent B grown by another user, after the advance preparation using the same labyrinths, the collection of coins starts with the agents A and B being placed at the same position in the labyrinths. In the collection of coins, the agents A and B perform an action at the same timing and compete with each other for higher total price of the coins collected in 100 times of actions, for example.

In the advance preparation, the users of the agent A and B instruct the respective agents, and meanwhile, in the collection of coins, simply watch the match.

In addition, the match between the agents A and B can be made via a network, for example.

In the third rule, the user joins a team with the agent and collects coins.

In this case, the user and the agent perform operations in a sharing manner (cooperatively).

Namely, in the advance preparation, the user memories the structure of the labyrinth and the coin positions in a partial range of the labyrinth, and causes the agent to obtain the structure of the labyrinth and the coin positions in the remaining range of the labyrinth.

Then, in the collection of the coins, the user collects the coins for the partial range of the labyrinth as the object, and the agent collects the coins for the remaining range of the labyrinth as the object.

In this case, the team of the user and the agent scores total price of the coins of the coins collected by the user and the coins collected by the agent, and the user plays the game, targeting higher score as the score of the team.

Moreover, in the third rule, the team of the user can play a match against a team of another user. The match between the team of the user and the team of the other user can be made via a network.

In addition, the team can include a plurality of agents as well as one agent. However, in the team-to-team match, the numbers of agents included in the individual teams are desirable to be identical with each other.

As described above, according to the (novel) game in which the virtual agent constituted similarly to the agent in FIG. 3 is applied to the character of the game, the user can grow an agent as the character of the game, and play a match against the agent after the growing or play a match between the agent grown by the user and an agent grown by another user.

In addition, the virtual agent constituted similarly to the agent in FIG. 3 can be applied to a character for an adventure game, a board game or the like as well as the coin collecting game, for example.

Figure 17:
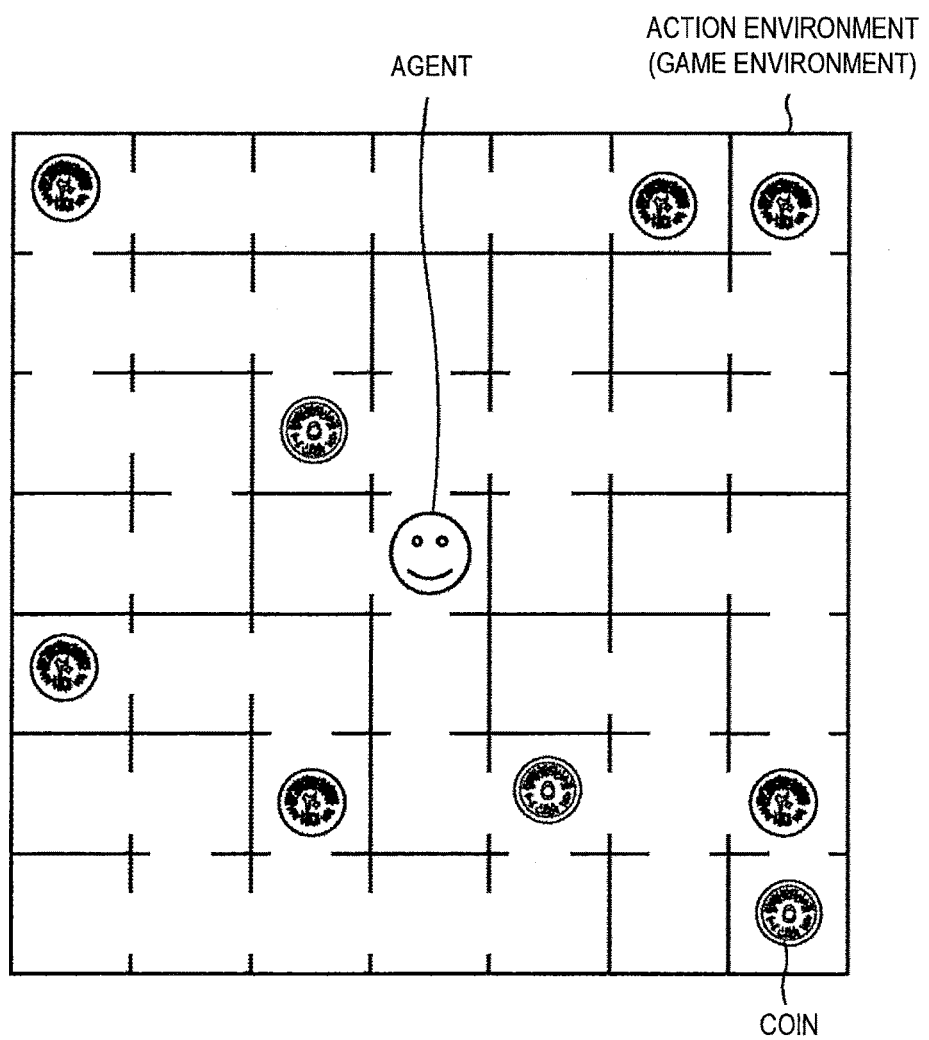
FIG. 17 is a diagram illustrating an example of a game environment of a coin collecting game.

FIG. 17 is a diagram illustrating an example of the game environment of the coin collecting game.

The game environment in FIG. 17 includes a labyrinth in which coins are placed. The coins placed in the labyrinth employ a plurality of kinds (two kinds in FIG. 17) of coins which are different in price (value).

The agent applied to a character of the game (virtual agent constituted similarly to the agent in FIG. 3) can move toward 4 directions, upward, downward, leftward and rightward, in one block unit in the labyrinth of the game environment.

In each box of the labyrinth, the agent can observe only a certain range from the box as a reference, whereas it is difficult to observe the entire labyrinth.

Figure 18A:
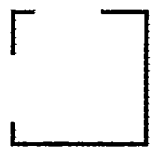
FIGS. 18A and 18B are diagrams illustrating examples of a range which the agent can observe in a box of a labyrinth.
Figure 18B:
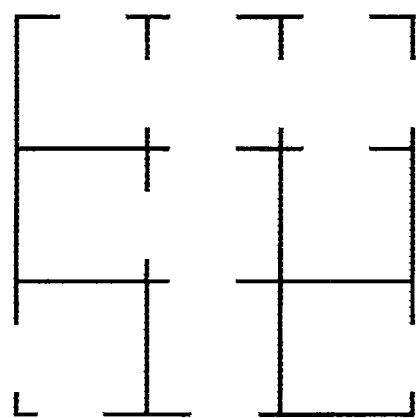

FIGS. 18A and 18B are diagrams illustrating examples of the range which the agent can observe in the box of the labyrinth.

In FIG. 18A, the agent can observe only the box where the agent is, that is, only the walls of the box where the agent is and the directions in which it can move from the box in each box in the labyrinth.

In FIG. 18B, the agent can observe 9 boxes totally, the box where the agent is and 8 boxes which are next in 8 directions from the box in each box in the labyrinth.

Figure 19:
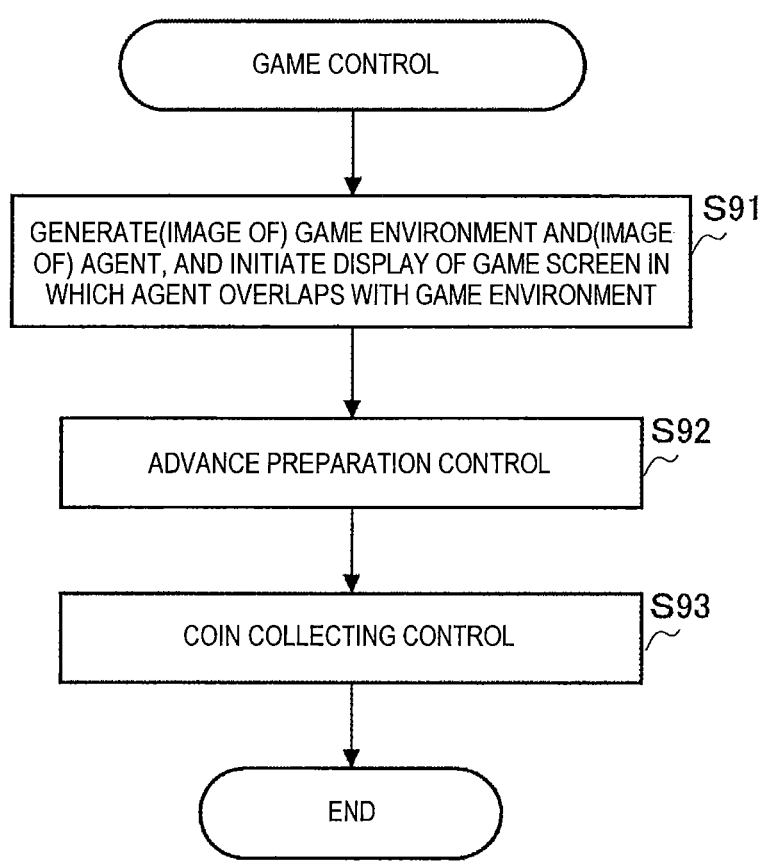
FIG. 19 is a flowchart for explaining processing which the game machine performs (game control) as to the coin collecting game.

FIG. 19 is a flowchart for explaining processing which the game machine in FIG. 16 performs (game control) as to the coin collecting game.

In step S91, the game environment controlling part 61 generates the labyrinth (image of it) in which coins are placed as the game environment (image of it). Furthermore, in step S91, the agent controlling part 62 generates the virtual agent (image of it) constituted similarly to the agent in FIG. 3 as the character of the game.

Then, the game controlling section 52 generates a screen of the game (image of it) by overlapping the agent generated by the agent controlling part 62 with the game environment (image of it) generated by the game environment controlling part 61 to supply to the display controlling part 53.

The display controlling part 53 initiates display of the screen of the game from the game controlling section 52. The process proceeds from step S91 to step S92.

In step S92, the agent controlling part 62 performs advance preparation control of causing the agent to perform advance preparation.

Namely, the agent controlling part 62 makes the agent (FIG. 3) in the reflex action mode.

In the reflex action mode (FIG. 4), the agent performs an action of moving in the labyrinth according to the innate rule, and by learning the extended HMM (FIG. 6) using an observed value observed in the action (and the action), obtains the structure of the labyrinth and obtains a coin position from the observed value.

In the reflex action mode, after the observed values (and the actions) have been observed to some extent, the structure of the labyrinth is obtained more or less in the extended HMM by the learning using the observed values Then, after, in the reflex action mode, the agent has performed actions the number of times specified in advance (step S18 in FIG. 4), the agent is switched from the reflex action mode to the recognition action mode (FIG. 7).

In the advance preparation control, the agent controlling part 62 enables (operates) the external goal configuring part 33, the random goal generating part 35 and the open end detecting part 37, and disables (terminates) the specific state detecting part 36 among the external goal configuring part 33, the random goal generating part 35, the specific state detecting part 36 and the open end detecting part 37 of the agent (FIG. 3).

As a result, in the advance preparation control, a goal state in the case that the mode in which the agent performs actions is the recognition action mode is limited to any of a state according to the instruction of the user, an open end, and a state randomly selected from the states of the extended HMM.

Then, when there is an instruction from the user, as described with reference to FIG. 8, the external goal configuring part 33 configures an external goal according to the instruction information representing the instruction from the user, and the goal selecting part 31 selects the goal state.

In this case, the agent moves in the labyrinth according to the action plan in which the external goal configured according to the instruction information is set to the goal state, that is, moves according to the instruction from the user and obtains the structure of the labyrinth and the coin positions.

Moreover, when there is not any instruction from the user and the open end detecting part 37 detects an open end, as described with reference to FIG. 8, the goal selecting part 31 selects the open end as the goal state.

In this case, the agent moves toward the position corresponding to the state of the extended HMM as the open end in the labyrinth as if it explores an unknown area according to the action plan in which the open end is the goal state, and obtains the structure of the labyrinth and the coin positions.

When there is not any instruction from the user and the open end detecting part 37 does not detect the open end, as described with reference to FIG. 8, the random goal generating part 35 randomly selects one state among the states of the extended HMM, and the goal selecting part 31 selects the state as the goal state.

Herein, the case where the open end detecting part 37 does not detect the open end means the case where the agent has obtained the entire structure of the game environment (labyrinth). The scale of the labyrinth and the advance preparation period are configured so as not to detect no further open end.

As described above, in the advance preparation, the agent obtains the structure of the labyrinth and the coin positions by moving as if it explores an unknown area, and moreover, by moving preferentially according to the instruction information representing the instruction from the user in the case of the instruction from the user.

After a advance preparation period specified in advance elapses after the initiation of the advance preparation, the process proceeds from step S92 to step S93, where the agent controlling part 62 performs coin collecting control of causing the agent to collect coins.

In the coin collecting control, the agent controlling part 62 enables the specific state detecting part 36 and disables the external goal configuring part 33, the random goal generating part 35 and the open end detecting part 37 among the external goal configuring part 33, the random goal generating part 35, the specific state detecting part 36 and the open end detecting part 37 of the agent (FIG. 3).

As a result, in the coin collecting control, the goal state in the case that the mode in which the agent performs actions is the recognition action mode is limited to a specific state.

Furthermore, in the coin collecting control, the agent controlling part 62 controls the specific state detecting part 36 of the agent (FIG. 3) so as to detect a state of the extended HMM corresponding to a coin position which the agent has not reached yet since the initiation of the coin collecting control among coin positions obtained in the advance preparation (hereinafter, also referred to as an unreached position) as the specific state.

The specific state detecting part 36 detects a state corresponding to one of the unreached positions as the specific state from among the states of the extended HMM according to control of the agent controlling part 62, and the goal selecting part 31 selects the specific state as the goal state.

In this case, the agent moves toward the position corresponding to the specific state, that is, the coin position in the labyrinth according to the action plan in which the specific state is the goal state, and collects the coin placed at the coin position.

In addition, as to the unreached position, the specific state detecting part 36 calculates, as an evaluation value which represents value of moving to the unreached position, a value inversely proportional to a distance from the present place of the agent to the unreached position, a value proportional to a price of the coin placed at the unreached position, or a value which is inversely proportional to a distance from the present place of the agent to the unreached position and is proportional to a price of the coin placed at the unreached position. The state of the extended HMM corresponding to the unreached position with the maximum evaluation value is detected as the specific state preferentially.

Moreover, when reaching the coin position as the unreached position, the agent excludes the coin position from the unreached positions.

After the time specified in advance as a time of the collection of coins elapses, the coin collecting control in step S93 is terminated and the coin collecting game ends.

Herein, in the case described above, in the collection of coins, the agent moves according to an action plan in which a state (specific state) corresponding to a coin position is set to the goal state and collects the coin placed at the coin position corresponding to the goal state. Whereas, the agent can obtain the shortest path (series of states of the extended HMM) in which the sum total of prices of coins which can be collected when moving according to an action plan becomes at its maximum as the action plan, and can collect coins by moving according to the action plan.

Moreover, in the case described above, in the advance preparation, the agent obtains the structure of the labyrinth and the coin positions by selecting an open end as the goal state and moving toward the open end as the goal state. Instead, in the advance preparation, the agent can obtain the structure of the labyrinth and the coin positions by moving toward a position corresponding to a state of the extended HMM whose reliability is low (state in which the structure of the labyrinth around the position corresponding to the state is not sufficiently obtained), for example.

The movement of the agent toward the state (of the extended HMM) whose reliability is low can be performed by the action determining part 24 determining the action according to a strategy for increasing information (observed values) of the structure of the labyrinth which has not yet been obtained in the extended HMM (hereinafter, also referred to as a strategy for increasing information which has not yet been obtained), for example.

The action determining part 24 can determine the action according to the strategy for increasing information which has been not yet obtained as follows, for example.

Namely, a probability $P_m(O)$ of observing an observed value O when the agent performs an action $U_m$ at time t is expressed by equation (17).

$$P_m(O) = \sum_{i=1}^{N} \sum_{j=1}^{N} \rho_i a_{ij}(U_m) b_j(O) \qquad (17)$$

In equation (17), $\rho_i$ denotes a state probability of being in a state $S_i$ at time t.

Supposing that $I(P_m(O))$ denotes a quantity of information in which an occurrence probability is represented by a probability $P_m(O)$, when determining an action according to a strategy for increasing some sort of information, a suffix m' of the action $U_{m'}$ is represented by equation (18).

$$m' = \arg\max_{m} \{I(P_m(O))\} \qquad (18)$$

Herein, $\operatorname{argmax}\{I(P_m(O))\}$ in equation (18) denotes a suffix m' that maximizes a quantity of information $I(P_m(O))$ in braces among suffixes m of the actions $U_m$.

Supposing that information not obtained in the extended HMM (hereinafter, also referred to as unknown state information) is employed as information, determining the action $U_{m'}$ according to equation (18) means determining an action according to the strategy for increasing information which has been not yet obtained, for increasing information of the structure of the labyrinth not obtained in the extended HMM.

Herein, supposing that $H^O(P_m)$ denotes entropy of information in which an occurrence probability is represented by a probability $P_m(O)$, equation (18) can be equivalently represented by the following equation.

Namely, entropy $H^O(P_m)$ can be represented by equation (19).

$$H^O(P_m) = \sum_{O=O_1}^{O_x} (-P_m(O) \times \log(P_m(O))) \qquad (19)$$

When the entropy $H^O(P_m)$ in equation (19) is large, a probability $P_m(O)$ of an observed value O being observed is equivalent for each observed value. Therefore, an observed value to be observed is unknown. Also, place where the agent is becomes more ambiguous and the agent obtains information of the unknown world that it has not known with higher possibility.

Accordingly, since unknown state information increases by increasing the entropy $H^O(P_m)$, equation (18) when determining an action according to the strategy for increasing information which has been not yet obtained can be represented by equation (20) which maximizes the entropy $H^O(P_m)$.

$$m' = \arg\max_{m}\{H^O(P_m)\} \qquad (20)$$

Herein, $\text{argmax}\{H^O(P_m)\}$ in equation (20) denotes a suffix m' that maximizes entropy $H^O(P_m)$ in braces among suffixes m of actions $U_m$.

The structure of the labyrinth and coin positions can be effectively obtained also by the agent performing an action $U_{m'}$ determined according to equation (20) similarly to the case of performing an action by setting the open end as a goal state.

Herein, Patent Literature 1 describes a multi-player shooting game in which the algorithm is fixed and bullets are shot so as to minimize room where the opponent can move in consideration of movement of the opponent. In addition, Patent Literature 1 only describes artificial intelligence technology simply used for a search problem and does not describe learning or growing a character for the competition.

Patent Literature 2 describes a game of growing a pet based on dialogue or instructions by the user inputting commands. In the game described in Patent Literature 2, personality and action of the pet vary in response to features of the way of speaking of the user and features obtained from the language, thereby this suppressing the user from being bored. In addition, the game in Patent Literature 2 does not autonomously search for the environment and participation of the human is necessary. Moreover, Patent Literature 2 does not describe growing by any instructions of actions except the dialogue or playing a match between characters.

Patent Literature 3 describes a game in which a character is put on a board and behaves variously in response to the user changing the inclination of the board. In addition, Patent Literature 3 describes a term "artificial intelligence", the term simply meaning the intelligent behavior of the character on the board during small inclination of the board, but does not describe learning.

Patent Literature 4 describes a technology relating to a technique for facilitating acquisition of positional relationship between its own character and an opponent character or various kinds of objects in a multi-player game or the like. In addition, Patent Literature 4 describes the term "artificial intelligence", the term simply meaning a module performing complex decision under various conditions to determine motion and tactics of the opponent character, but does not describe learning or growing.

Patent Literature 5 describes a technology for make a game fun by changing personality of a character and adding a character in an RPG (Role-Playing Game). In addition, Patent Literature 5 describes the term "artificial intelligence", the term simply meaning modules determining actions of the character. Also, Patent Literature 5 describes exchange and circulation of the modules, but does not describe learning with the artificial intelligence or playing a match between the characters.

(Explanation of Computer to which the Present Technology is Applied)

Next, the above-mentioned series of processes can be performed by not only hardware but software. When the series of processes are performed by software, a program constituting the software is installed in a general-purpose computer or the like.

Therefore, FIG. 20 illustrates an example of a configuration of one embodiment of a computer in which a program executing the above-mentioned series of processes is installed.

The program can be previously recorded in a hard disk drive 105 or a ROM 103 as a recording medium mounted in the computer.

Instead, the program can be stored in a removable recording medium 111. Such a removable recording medium 111 can be provided as so-called package software. Herein, the removable recording medium 111 can employ, for example, a flexible disk, a CD-ROM (Compact Disc Read Only Memory), an MO (Magneto Optical) disc, a DVD (Digital Versatile Disc), a magnetic disk, a semiconductor memory or the like.

In addition, the program can be installed in the computer from the removable recording medium 111 as mentioned above, or can be downloaded into the computer via a communication network or a broadcasting network, being installed in a mounted hard disk drive 105. Namely, the program can be transferred into the computer in a wireless manner via a satellite for satellite digital broadcasting or can be transferred into the computer in a wired manner via a network such as a LAN (Local Area Network) and the Internet from a download site, for example.

The computer includes a CPU (Central Processing Unit) 102 therein and an I/O interface 110 is connected to the CPU 102 via a bus 101.

After the CPU 102 accepts a command inputted by operation or the like of an input part 107 performed by the user via the I/O interface 110, according to those, it executes the program stored in the ROM (Read Only Memory) 103. Or the CPU 102 loads the program stored in the hard disk drive 105 in a RAM (Random Access Memory) 104 to execute it.

Thereby, the CPU 102 performs the processes according to the above-mentioned flowcharts or the processes performed in the configurations of the above-mentioned block diagrams. Then, the CPU 102 outputs the processed results from an output part 106 via the I/O interface 110 as necessary, for example or transmits them from a communication part 108, and further records them in the hard disk drive 105.

In addition, the input part 107 is constituted of a keyboard, a mouse, a microphone and the like. Moreover, the output part 106 is constituted of an LCD (Liquid Crystal Display), a loud speaker and the like.

Herein, the processes performed by the computer according to the program in the present specification are not necessarily performed in a time series in the order described in the flowcharts. Namely, the processes performed by the computer according to the program include processes executed in parallel or individually (processes in a parallel processing manner or an object-oriented manner, for example).

Moreover, the program can be processed by one computer (processor) or by plural computers in a distributed processing manner. Furthermore, the program may be executed after transferred to a remote computer.

It should be understood by those skilled in the art that various modifications, combinations, sub-combinations and alterations may occur depending on design requirements and other factors insofar as they are within the scope of the appended claims or the equivalents thereof.

For example, the present technology may include a configuration of cloud computing in which one function is shared by plural devices via a network and processed cooperatively.

Moreover, each step illustrated in the above-mentioned flowcharts can be executed by one device or executed by plural devices in a sharing manner.

Furthermore, when one step includes plural processes, the plural processes included in the one step can be executed by one device or executed by plural devices in a sharing manner.

Additionally, the present technology may also be configured as below.

(1) An information processing apparatus including:
- a learning part performing learning of a model of an environment in which an agent performs action, using an observed value observed in the agent when the agent capable of action performs action;
- an action determining part determining action to be performed by the agent, based on the model; and
- a user instruction output part outputting instruction information representing an instruction from a user according to the instruction from the user, wherein
- the action determining part determines the action performed by the agent according to the instruction information when there is an instruction from the user.

(2) The information processing apparatus according to (1), wherein
- the model is defined by
  - a state transition probability, for each action, of state transition from a state due to the action performed by the agent and
  - an observation probability of the observed value being observed from the state, and
- the learning part performs learning of the model using action performed by the agent and an observed value observed in the agent when the agent performs the action.

(3) The information processing apparatus according to (2), wherein
- the model is an extended HMM (Hidden Marcov Model) in which a state transition probability of an HMM is extended to a state transition probability for each action performed by the agent, and
- the learning part performs learning of the extended HMM of estimating the state transition probability for each action and the observation probability according to a Baum-Welch re-estimation method.

(4) The information processing apparatus according to (3), further including:
- a state recognizing part recognizing a present state as a state at a present time in the extended HMM using action performed by the agent and an observed value observed in the agent when the action is performed, based on the extended HMM; and
- a goal determining part determining one of states of the extended HMM as a goal state which is a goal, wherein
- the action determining part calculates an action plan as a series of action that maximizes likelihood of state transition from the present state to the goal state based on the extended HAM, and determines action to be performed next by the agent according to the action plan.

(5) The information processing apparatus according to (4), wherein
- the goal determining part determines the goal state according to the instruction information when there is the instruction from the user, and
- the action determining part calculates an action plan to the goal state determined according to the instruction information when there is the instruction from the user, and determines action to be performed next by the agent according to the action plan.

(6) The information processing apparatus according to (4) or (5), further including
- an open end detecting part detecting an open end as a state in which there is a state transition not yet made among state transitions performable from another state in which a predetermined observed value is observed as a transition source, and in which an observed value same as the predetermined observed value is observed, wherein
- the goal determining part determines the open end as the goal state.

(7) The information processing apparatus according to (6), wherein
- the open end detecting part
  - obtains an action probability as a probability of the agent performing each action when each observed value is observed, using the state transition probability and the observation probability,
  - calculates an action probability that is based on observation probability as a probability of the agent performing each action in each state in which each observed value is observed, by multiplying the action probability and the observation probability,
  - calculates an action probability that is based on state transition probability as a probability of the agent performing each action in each state, with respect to each state, by adding together the state transition probabilities of state transitions from the state as a transition source, for each action, and
  - detects, as the open end, a state in which a difference between the action probability based on observation probability and the action probability based on state transition probability is not less than a predetermined threshold value.

(8) The information processing apparatus according to (6) or (7), controlling
- advance preparation processing of the agent performing learning to obtain a structure of a labyrinth in the extended HMM using an observed value observed by performing action of moving in the labyrinth in which an item is placed and action performed by the agent according to an action plan in which the open end is set as the goal state or an action plan to the goal state determined according to the instruction information, and
- collecting processing of the agent collecting an item by performing action of moving in the labyrinth according to an action plan in which a state corresponding to a place where the item is placed in the labyrinth is set as a goal state.

(9) The information processing apparatus according to (3), wherein
- the action determining part determines action according to a strategy for increasing unknown information not obtained in the extended HMM.

(10) The information processing apparatus according to (9), wherein
the action determining part determines, as action to be performed next by the agent, action that maximizes entropy of information in which an occurrence probability is represented by a probability of each observed value being observed when the agent performs action.

(11) The information processing apparatus according to (10), controlling
advance preparation processing of the agent performing learning to obtain a structure of a labyrinth in the extended HMM using an observed value observed by moving in the labyrinth in which an item is placed and action performed by the agent, by performing action that maximizes the entropy or action determined according to the instruction information, and
collecting processing of the agent collecting an item by performing action of moving in the labyrinth according to an action plan in which a state corresponding to a place where the item is placed in the labyrinth is set as a goal state.

(12) An information processing method performed by an information processing apparatus including:
a learning part performing learning of a model of an environment in which an agent performs action, using an observed value observed in the agent when the agent capable of action performs action;
an action determining part determining action to be performed by the agent, based on the model; and
a user instruction output part outputting instruction information representing an instruction from a user according to the instruction from the user, wherein
the information processing method includes determining, by the action determining part, the action to be performed by the agent according to the instruction information when there is an instruction from the user.

(13) A program causing a computer to function as:
a learning part performing learning of a model of an environment in which an agent performs action, using an observed value observed in the agent when the agent capable of action performs action;
an action determining part determining action to be performed by the agent, based on the model; and
a user instruction output part outputting instruction information representing an instruction from a user according to the instruction from the user, wherein
the action determining part determines the action to be performed by the agent according to the instruction information when there is an instruction from the user.

The present disclosure contains subject matter related to that disclosed in Japanese Priority Patent Application JP 2011-195619 filed in the Japan Patent Office on Sep. 8, 2011, the entire content of which is hereby incorporated by reference.

What is claimed is:

1. An information processing apparatus, comprising:
at least one processor configured to:
construct a model of an environment, based on a first action by an agent in the environment, wherein the first action by the agent is based on a user instruction;
determine a second action by the agent based on the model of the environment, wherein the second action is one action of a series of actions of an action plan;
move the agent in the environment based on the action plan with a goal state that corresponds to a position of an item in the environment;
recognize a present state of the agent based on the first action by the agent;
determine at least one of a recognition mode or a reflex action mode in which the agent acts, based on the present state that is a known state,
wherein the present state is the known state, based on a first state transition probability associated with the first action greater than a first threshold value, and
wherein the first action and the second action correspond to a movement of the agent in the environment; and
move the agent towards the goal state based on the action plan that is determined based on at least one of the determined recognition mode or the determined reflex action mode,
wherein the agent collects the item present at the goal state based on the user instruction.

2. The information processing apparatus according to claim 1,
wherein the model is defined by
the first state transition probability, for each action of the series of actions by the agent, of a state transition from the present state based on the first action by the agent, and
an observation probability of an observed value observed from the present state, and
wherein the at least one processor is further configured to construct the model based on the first action by the agent and the observed value observed in the agent based on the first action by the agent.

3. The information processing apparatus according to claim 2,
wherein the model is an extended HMM (Hidden Marcov Model) in which a second state transition probability of an HMM is extended to the first state transition probability for each action of the series of actions by the agent, and
wherein the at least one processor is further configured to construct the extended HMM for estimation of the first state transition probability for each action of the series of actions and the observation probability based on a Baum-Welch re-estimation method.

4. The information processing apparatus according to claim 3,
wherein the at least one processor is further configured to:
recognize the present state in the extended HMM based on the first action by the agent and the observed value observed in the agent;
determine one state of a plurality of states of the extended HMM as the goal state which is a goal;
calculate the action plan as the series of actions that maximizes likelihood of the state transition from the present state to the goal state based on the extended HMM; and
determine the second action by the agent based on the action plan.

5. The information processing apparatus according to claim 4,
wherein the at least one processor is further configured to:
determine the goal state based on instruction information that represents the user instruction;
calculate the action plan to reach to the goal state determined based on the instruction information; and
determine the second action by the agent based on the action plan.

6. The information processing apparatus according to claim 4,
wherein the at least one processor is further configured to:
detect an open end state in which there is at least one state transition that is unperformed among a plurality of state transitions performable from a state different from the open end state in which a known observed value is observed as a transition source, and in which the observed value is same as the known observed value; and
determine the open end state as the goal state.

7. The information processing apparatus according to claim 6,
wherein the at least one processor is further configured to:
obtain a first action probability as a probability of each action of the series of actions by the agent based on a determination that each of the observed value is observed, based on the first state transition probability and the observation probability;
calculate a second action probability based on the observation probability of each action of the series of actions by the agent in each state in which each of the observed value is observed, by multiplication of the first action probability and the observation probability;
calculate a third action probability based on the first state transition probability of each action of the series of actions by the agent in each state, with respect to each state, by addition of a plurality of state transition probabilities of the plurality of state transitions from the state as the transition source, for each action of the series of actions; and
detect, as the open end state, a second state in which a difference between the first action probability based on the observation probability and the second action probability based on the first state transition probability is greater than or equal to a second threshold value.

8. The information processing apparatus according to claim 6,
wherein the at least one processor is further configured to control:
advance preparation process of the agent configured to obtain a structure of a labyrinth, which is included in the environment, in the extended HMM based on the observed value observed by a past action of movement of the agent in the environment in which the item is placed and based on the first action by the agent, wherein the first action of the agent is based on at least one of the action plan in which the open end state is set as the goal state or the action plan in which the goal state is determined based on instruction information that represents the user instruction.

9. The information processing apparatus according to claim 3,
wherein the at least one processor is further configured to determine the second action by the agent based on a strategy to obtain information of a structure of the environment unavailable in the extended HMM.

10. The information processing apparatus according to claim 9,
wherein the at least one processor is further configured to determine, as the second action by the agent, an action of the series of actions that maximizes an entropy of information, wherein the information comprises an occurrence probability represented by a probability of each of the observed value observed based on the action by the agent configured to maximize the entropy.

11. The information processing apparatus according to claim 10,
wherein the at least one processor is further configured to control:
advance preparation process of the agent configured to obtain the structure of a labyrinth, which is included in the environment, in the extended HMM based on the observed value observed by the movement of the agent in the environment in which the item is placed and the first action configured to maximize the entropy of the information.

12. An information processing method, including:
in an information processing apparatus:
constructing a model of an environment, using a first action by an agent in the environment, wherein the first action by the agent is based on a user instruction;
determining a second action by the agent based on the model of the environment, wherein the second action is one action of a series of actions of an action plan;
moving the agent in the environment based on the action plan with a goal state corresponding to a position of an item in the environment;
recognizing a present state of the agent based on the first action by the agent;
determining at least one of a recognition mode or a reflex action mode in which the agent acts, based on the present state that is a known state,
wherein the present state is the known state, based on a first state transition probability associated with the first action greater than a threshold value; and
wherein the first action and the second action correspond to a movement of the agent in the environment; and
moving the agent towards the goal state based on the action plan that is determined based on at least one of the determined recognition mode or the determined reflex action mode,
wherein the agent collects the item present at the goal state based on the user instruction.

13. A non-transitory computer-readable medium having stored thereon computer-executable instructions that, when executed by a processor, cause a computer to execute operations, the operations comprising:
constructing a model of an environment, using a first action by an agent in the environment, wherein the first action by the agent is based on a user instruction;
determining a second action by the agent based on the model of the environment, wherein the second action is one action of a series of actions of an action plan;
moving the agent in a the environment based on the action plan with a goal state corresponding to a position of an item in the environment;
recognizing a present state of the agent based on the first action by the agent;
determining at least one of a recognition mode or a reflex action mode in which the agent acts, based on the present state that is a known state,
wherein the present state is the known state, based on a first state transition probability associated with the first action greater than a threshold value; and
wherein the first action and the second action correspond to a movement of the agent in the environment; and moving the agent towards the goal state based on the action plan that is determined based on at least one of the determined recognition mode or the determined reflex action mode,
wherein the agent collects the item present at the goal state based on the user instruction.

14. The information processing method according to claim 12, further comprising adjusting a first time required for one action of the series of actions by the agent to synchronize with a second time required for one user action.

15. The information processing apparatus according to claim 1,
wherein the at least one processor is further configured to move the agent in a labyrinth which is included in the environment, and
wherein the agent is configured to collect the item in the labyrinth based on the agent that is at the position of the item in the labyrinth.

* * * * *